United States Patent
Kazama et al.

(10) Patent No.: US 11,580,023 B2
(45) Date of Patent: Feb. 14, 2023

(54) INFORMATION PROCESSING APPARATUS, COMPUTER-READABLE RECORDING MEDIUM HAVING STORED THEREIN MEMORY CONTROL PROGRAM, AND COMPUTER-READABLE RECORDING MEDIUM HAVING STORED THEREIN INFORMATION PROCESSING PROGRAM

(71) Applicant: FUJITSU LIMITED, Kawasaki (JP)

(72) Inventors: Satoshi Kazama, Kawasaki (JP); Shinya Kuwamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/189,436

(22) Filed: Mar. 2, 2021

(65) Prior Publication Data

US 2021/0286725 A1    Sep. 16, 2021

(30) Foreign Application Priority Data

Mar. 11, 2020 (JP) .............................. JP2020-042130
Dec. 14, 2020 (JP) .............................. JP2020-206427

(51) Int. Cl.
G06F 12/08 (2016.01)
G06F 12/0806 (2016.01)
G06F 12/0891 (2016.01)

(52) U.S. Cl.
CPC ...... *G06F 12/0806* (2013.01); *G06F 12/0891* (2013.01); *G06F 2212/1024* (2013.01)

(58) Field of Classification Search
CPC ............ G06F 12/0284; G06F 12/0842; G06F 12/123; G06F 12/0868; G06F 12/0882;
(Continued)

(56) References Cited

U.S. PATENT DOCUMENTS 9,124,613 B2 * 9/2015 Nagami ................ G06F 3/0683
2008/0021853 A1   1/2008 Modha et al.
(Continued)

FOREIGN PATENT DOCUMENTS

JP   2008-27444 A   2/2008
JP   2015-35028 A   2/2015
(Continued)

OTHER PUBLICATIONS

J. Park, H. Yeom and Y. Son, "Page Reusability-Based Cache Partitioning for Multi-Core Systems," in IEEE Transactions on Computers, vol. 69, No. 6, pp. 812-818, Jun. 1, 2020.*
(Continued)

*Primary Examiner* — Pierre Michel Bataille
(74) *Attorney, Agent, or Firm* — Staas & Halsey LLP

(57) ABSTRACT

An information processing apparatus including: a first management data storing region that stores a plurality of first links being provided one for each of multiple calculating cores and representing an order of migration of pages of a page group allocated to the calculating core among a plurality of the pages; a second management data storing region that stores a second link being provided for an operating system and managing a plurality of pages selected in accordance with the order of migration among the page group of the plurality of first links as a group of candidate pages to be migrated to the second memory; and a migration processor that migrates data of a page selected from the group of the second link from the first memory to the second memory. With this configuration, occurrence of a spinlock is reduced, so that the load on processor is reduced.

12 Claims, 24 Drawing Sheets

(58) Field of Classification Search
CPC ....... G06F 2212/1024; G06F 2212/214; G06F 2212/1016; G06F 12/0806; G06F 12/0891
See application file for complete search history.

(56) References Cited

U.S. PATENT DOCUMENTS

| | | | | |
|---|---|---|---|---|
| 2010/0257306 | A1* | 10/2010 | Kawaguchi | G06F 3/0688 |
| | | | | 711/E12.001 |
| 2013/0080703 | A1* | 3/2013 | Kumagai | G06F 9/5072 |
| | | | | 711/E12.002 |
| 2015/0205642 | A1* | 7/2015 | Xu | G06F 9/4881 |
| | | | | 718/105 |
| 2015/0339229 | A1* | 11/2015 | Zhang | G06F 3/0613 |
| | | | | 711/130 |
| 2015/0356078 | A1* | 12/2015 | Kishimoto | G06F 16/119 |
| | | | | 707/610 |
| 2016/0154589 | A1 | 6/2016 | Takeda et al. | |
| 2019/0155730 | A1 | 5/2019 | Kumabe et al. | |
| 2019/0205155 | A1* | 7/2019 | Kim | G06F 9/45558 |
| 2019/0324677 | A1* | 10/2019 | Oe | G06F 3/0604 |
| 2020/0097415 | A1 | 3/2020 | Fukumoto | |

FOREIGN PATENT DOCUMENTS

| | | |
|---|---|---|
| JP | 2019-95881 A | 6/2019 |
| JP | 2020-47084 A | 3/2020 |

OTHER PUBLICATIONS

M. Chaudhuri, "PageNUCA: Selected policies for page grain locality management in large shared chip-multiprocessor caches," 2009 IEEE 15th International Symposium on High Performance Computer Architecture, 2009, pp. 227-238.*

* cited by examiner

INFORMATION PROCESSING APPARATUS, COMPUTER-READABLE RECORDING MEDIUM HAVING STORED THEREIN MEMORY CONTROL PROGRAM, AND COMPUTER-READABLE RECORDING MEDIUM HAVING STORED THEREIN INFORMATION PROCESSING PROGRAM

CROSS-REFERENCE TO RELATED APPLICATION

This application is based upon and claims the benefit of priority of the prior Japanese Patent application No. 2020-206427, filed on Dec. 14, 2020, and the prior Japanese Patent application No. 2020-042130, filed on Mar. 11, 2020, the entire contents of which are incorporated herein by reference.

FIELD

The present invention relates to an information processing apparatus, a computer-readable recording medium having stored therein a memory control program, a computer-readable recording medium having stored therein an information processing program, and a method for information processing.

BACKGROUND

Hierarchical memory control is sometimes used which hierarchizes a memory space seen from an application by dividing the memory space into a high-speed memory and a low-speed memory. In hierarchical memory control, a technique of expanding a memory has been known in which a memory capacity more than Dynamic Random Access Memory (DRAM) comes to be available by using storage such as a Solid State Drive (SSD) as a low-speed memory.

Such a technique of expanding a memory ordinarily uses a part of a DRAM as a cache memory for a low-speed memory.

A cache memory is managed in a unit of a page. The data size of the page is, for example, 4 KB. A process of migrating a page from a cache memory to storage is performed by a background thread.

Data (page) to be migrated from a cache memory to storage is selected by a Least Recently Used (LRU) algorithm.

An LRU list is used to manage the priorities of pages to be migrated to storage. The LRU list stores a pointer to a page structure in which page information (such as an address) is stored, an access flag indicating the presence of an access to the page, and link information of the list.

Referring to the LRU list configured in this manner, it is determined that a page not having been accessed for the longest time is one to be migrated (cache out) to the storage.

[Patent Literature 1] Japanese Laid-open Patent Publication No. 2008-27444

[Patent Literature 2] Japanese Laid-open Patent Publication No. 2019-95881

In a multi-core Central Processing Unit (CPU) having multiple CPU cores, multiple threads (multithread) executed by the multiple CPU cores access the LRU list. In addition, a thread that identifies a page to be migrated from a cache memory to storage also accesses the LRU list for reference.

For the above, when one thread accesses the LRU list, exclusive control that locks the LRU list is required to prevent another thread from modifying the LRU list. In cases where an LRU list is locked when a thread tries to refer to the LRU list, the thread stands by, carrying out spinlock, until the LRU list is unlocked.

In such a conventional method of hierarchical memory control, an exclusive process caused by locking the LRU list increases a CPU load due to spinlock, and the CPU performance is degraded.

SUMMARY

According to an aspect of the embodiments, an information processing apparatus including: a first memory that stores data in a unit of page; a second memory that stores data of a page of a migration target from the first memory; a processor including a plurality of calculating cores; a first management data storing region that stores a plurality of first links being provided one for each of the plurality of calculating cores and representing an order of migration of pages of a page group allocated to the calculating core among a plurality of the pages; a second management data storing region that stores a second link being provided for an operating system and managing a plurality of pages selected in accordance with the order of migration of the page group of the plurality of first links as a group of candidate pages to be migrated to the second memory; and a migration processor that migrates data of a page selected from the group of the second link from the first memory to the second memory.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
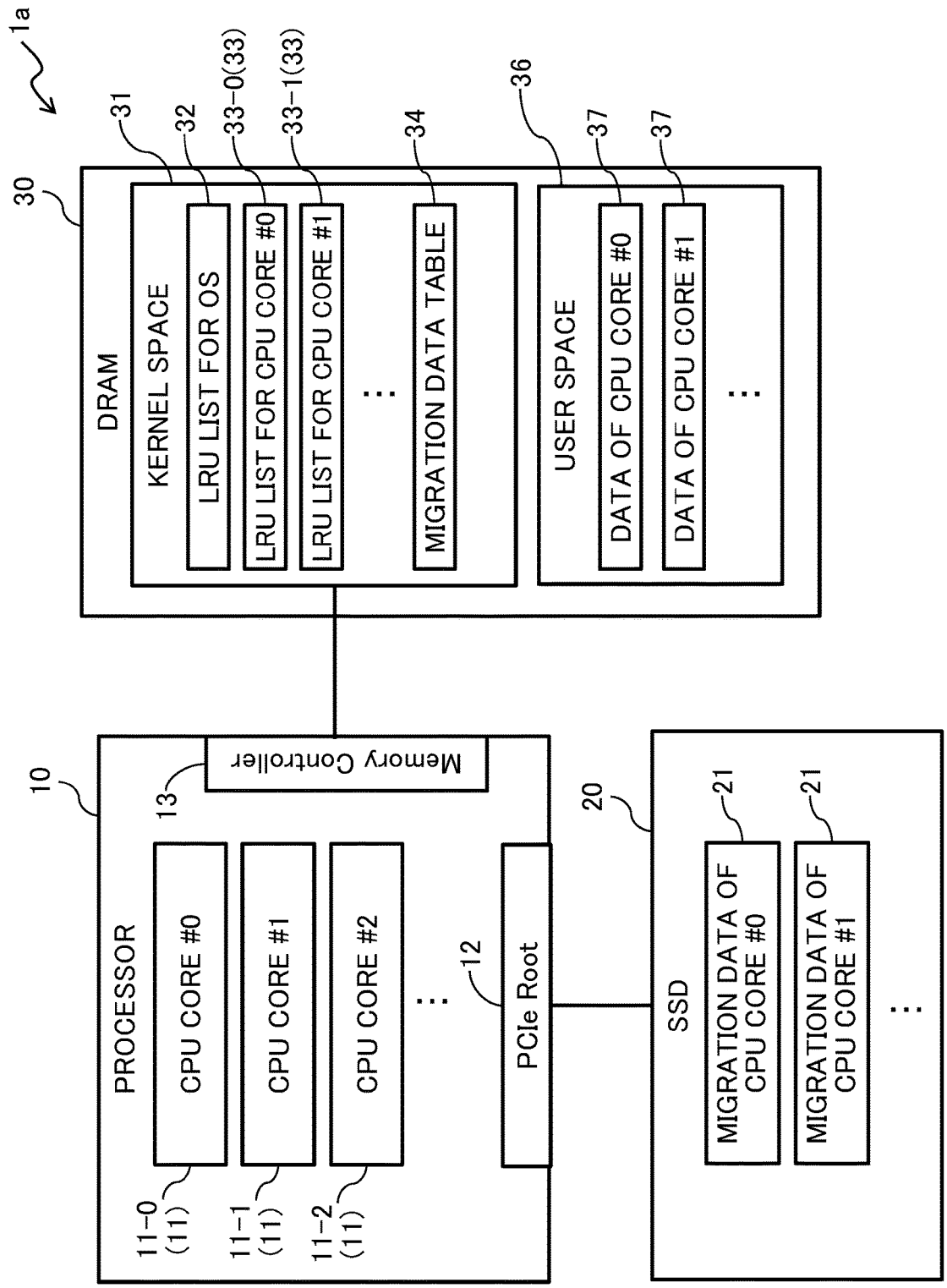
FIG. 1 is a diagram schematically illustrating a configuration of a computer system according to an example of a first embodiment.

Hereinafter, an information processing apparatus, a memory control program, and an information processing program according to embodiments will be described with reference to the accompanying drawings. However, the following embodiments are merely illustrative and are not intended to exclude the application of various modifications and techniques not explicitly described in the embodiments. Specifically, the present embodiments can be implemented by various modifications (e.g., combining the embodiments and the modifications) without departing from the scope of the embodiments. Further, each of the drawings can include additional functions not illustrated therein to the elements illustrated in the drawings.

1. First Embodiment (A) Configuration:

FIG. 1 is a diagram schematically illustrating a configuration of a computer system 1a according to an example of a first embodiment.

The computer system 1a illustrated in FIG. 1 includes a processor 10, an SSD 20, and a DRAM 30.

The processor 10 is a multi-core processor provided with multiple CPU cores 11-0, 11-1, 11-2, . . . . Hereafter, when not being discriminated from one another, the CPU cores 11-0, 11-1, 11-2, . . . are each represented by the CPU core 11. Further, the CPU core 11-0 is sometimes referred to as CPU core #0. Similarly, the CPU core 11-1 is sometimes referred to as the CPU core #1, and the CPU core 11-2 is sometimes referred to as the CPU core #2.

Each CPU core 11 is a calculating core that executes a thread.

The processor 10 also includes a Peripheral Component Interconnect Express Root (PCIe route) port 12 and a memory controller 13.

The SSD 20 is connected to the PCIe root port 12 and the DRAM 30 is connected to the memory controller 13. Incidentally, the SSD 20 may be connected according to the standard of Non-Volatile Memory Express (NVMe), or may be variously modified.

This computer system 1a achieves hierarchical memory control.

Figure 2:
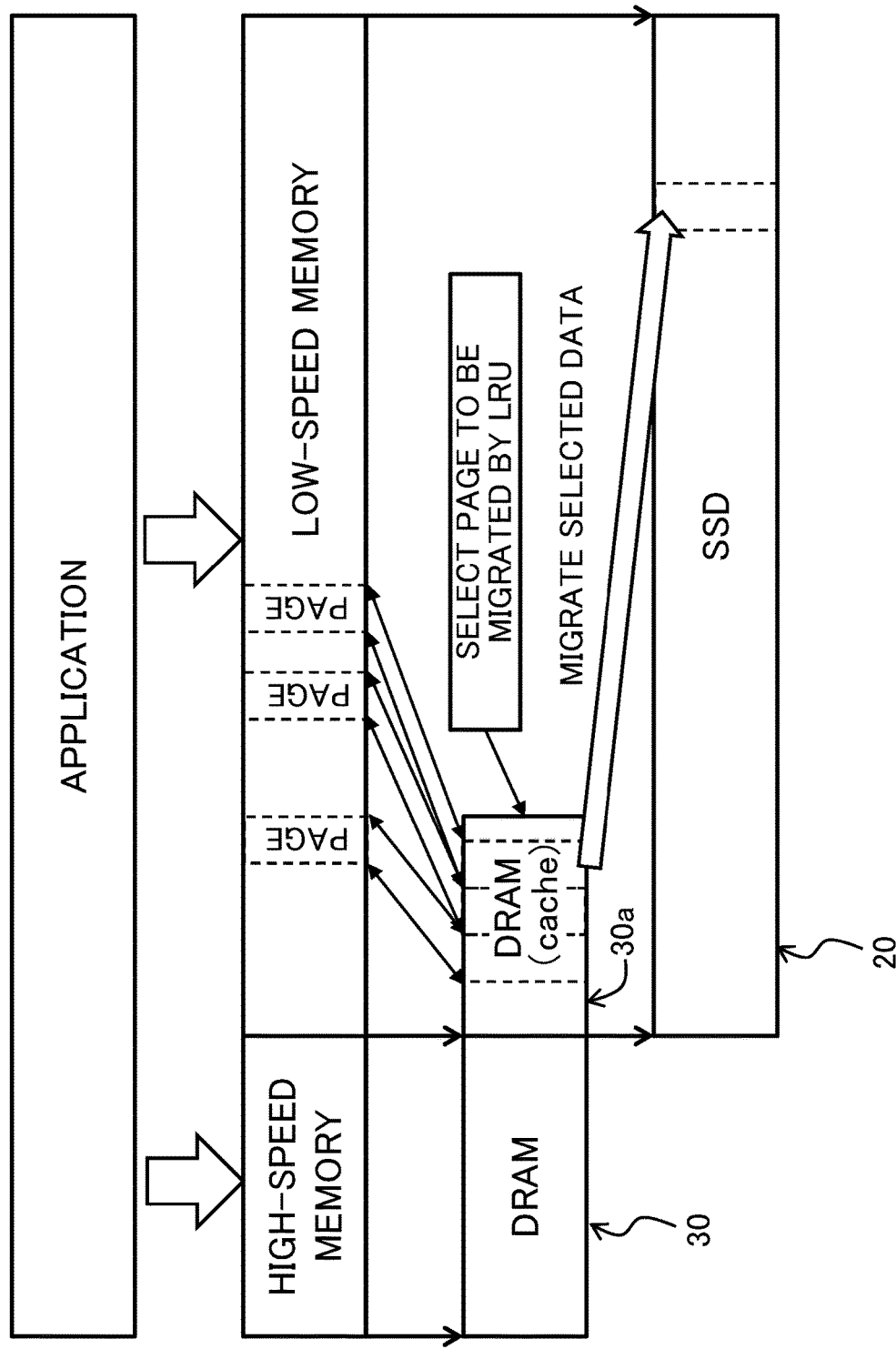
FIG. 2 is a diagram illustrating hierarchical memory control in the computer system according to an example of the first embodiment.

FIG. 2 is a diagram illustrating hierarchical memory control in the computer system 1a according to an example of the first embodiment.

In hierarchical memory control, the DRAM 30 is used as a high-speed memory and also the SSD 20 is used as the low-speed memory. In addition, a part of the storing region of the DRAM 30 is used as a cache memory (hereinafter, sometimes simply referred to as cache) 30a.

The cache 30a is managed in a unit of a page. The data size of the page is, for example, 4 KB. A process of migrating a page from the cache 30a to the storage is performed by a page migration thread that is to be described below. The cache 30a corresponds to the first memory in which data is stored in a unit of a page.

In the present computer system 1a, data (page) to be migrated from the cache 30a to the SSD 20 is selected by an LRU algorithm, and the selected page is migrated from the cache 30a to the SSD 20.

The SSD 20 is a storing device using a semiconductor element memory, and as described above, a part of the storing region is used as a memory (low-speed memory).

In a remaining region of the SSD 20 except for the region used as the low-speed memory, pages migrated from the cache 30a to be described below are stored. A process of migrating a page on the cache 30a to the SSD 20 may be referred to as a cache out, or may be referred to as an ejection process or a recovery process. The SSD 20 corresponds to a second memory that stores the data of a page determined to be a migration target from the cache 30a.

The SSD 20 stores the pages ejected from the cache 30a. The page ejected from the cache 30a and then migrated to the SSD 20 may be referred to as migration data. In the example illustrated in FIG. 1, a page of each CPU core 11 ejected from the cache 30a is stored as migration data 21.

The DRAM 30 is a semiconductor storing memory that achieves faster data access than the SSD 20.

A part of the storing region of the DRAM 30 is used as a high-speed memory by an application executed by the CPU cores 11, and another part of the storing region is used as the cache memory (cache) 30a by the same application.

In the example of FIG. 1, the storing region of the DRAM 30 includes a kernel space 31 and a user space 36.

The user space 36 is, for example, a storing region used by an application executed by each CPU core 11, and stores data 37 used by each CPU core 11.

The kernel space 31 is a storing region used by the kernel of an Operating System (OS) executed by the CPU core 11. In the present embodiment, description will be made in relation to an example assuming that the OS is Linux (registered trademark).

In the embodiment of FIG. 1, the kernel space 31 stores an LRU list 32 for OS, a migration data table 34, and LRU lists 33-0, 33-1, ... for each CPU core.

—LRU List 33 for Each CPU Core—

LRU lists 33-0, 33-1, ... for each CPU core are LRU lists provided one for each of the CPU cores 11.

The LRU list 33 for each CPU core has, for example, a data structure (list structure) in which linking elements, called structures, are sequentially concatenated by pointers. The LRU list 33 for each CPU core is provided for each CPU core 11, and corresponds to a plurality of first links representing an order of migration of pages of a page group allocated to each of the multiple CPU cores 11 among multiple pages. The kernel space 31 of the DRAM 30 that stores the LRU list 33 for each CPU core corresponds to a first management data storing region that stores the first links.

In the example illustrated in FIG. 1, the LRU list 33-0 for each CPU core is provided for the CPU core 11-0, and the LRU list 33-1 for each CPU core is provided for the CPU core 11-1. The number of LRU lists 33 for each CPU core is equal to the number of CPU cores 11 provided in the processor 10.

Hereafter, the LRU list 33-0 for each CPU core is sometimes represented as an LRU list 33-0 for the CPU core #0. Similarly, the LRU list 33-1 for each CPU core is sometimes represented as an LRU list 33-1 for the CPU core #1. Further, when not discriminating from one another, the LRU lists 33-0, 33-1, ... for each CPU core are represented as the LRU lists 33 for each CPU core.

In the computer system 1a of the first embodiment, the LRU list 33 for each CPU core is provided for each CPU core 11. Into the LRU list 33 for each CPU core, data about a page on which data access occurs when the CPU core 11 executes a thread. For example, the LRU list 33 for each CPU core stores a pointer to a page structure in which page information (such as an address) is stored, an access flag indicating the presence of an access to the page, and link information of the list.

The LRU list 33 for each CPU core manages pages that are accessed by the CPU core 11 in accordance with an LRU algorithm. In the LRU list 33 for each CPU core, management is conducted in accordance with the time during which the page on which data access occurs is not being accessed. By referring to the LRU list 33 for each CPU core, it is possible to grasp a page that the CPU core 11 accessed the most previously, which means a page not having been referred by the CPU core 11 for the longest time.

A page migration thread 101 (to be detailed below) to be executed by each CPU core 11 specifies a page not having been referred by the CPU core 11 (hereinafter, sometimes referred to as local CPU core 11) that executes the page migration thread 101 for the longest time with reference to this LRU list 33 for each CPU core. Then, the page migration thread 101 selects this specified page as a migration candidate page that is to be migrated from the cache 30a to the SSD 20.

—LRU List 32 for OS—

The LRU list 32 for OS manages a migration candidate page selected from each LRU list 33 for each CPU core via the LRU algorithm. That is, the LRU list 32 for OS manages a migration candidate page that the page migration thread 101 being executed by each CPU core 11 selects from the LRU list 33 for each CPU core of the local CPU core 11.

The LRU list 32 for OS is an LRU-list used by a page migration thread 101 (described below) provided as a standard function to the OS. The LRU list 32 for OS can be said to be an LRU list provided for the OS. Alternatively, the LRU list 32 for OS may be referred to as an LRU list 32 for Linux. The LRU list 32 for OS is provided for the operating system and corresponds to a second link that manages multiple pages selected in accordance with the order of migration of the page group of the multiple LRU list 33 for each CPU core as a group of candidate pages to be migrated to the SSD 20. In addition, the kernel space 31 that stores the LRU list 32 for OS corresponds to a second management data storing region that stores the second link.

The LRU list 32 for OS corresponds to a second link that is managed by the OS, that is selected from one of the multiple LRU lists 33 for each CPU core, and that indicates a group of candidates to be migrated to the SSD 20.

The page migration thread 101 specifies a migration candidate page not having been referred for the longest time from among the migration candidate pages registered in the LRU list 32 for OS and selects the specified page as migration target page in accordance with the LRU algorithm. The page migration thread 101 stores this selected migration target page into the SSD 20.

Figure 3:
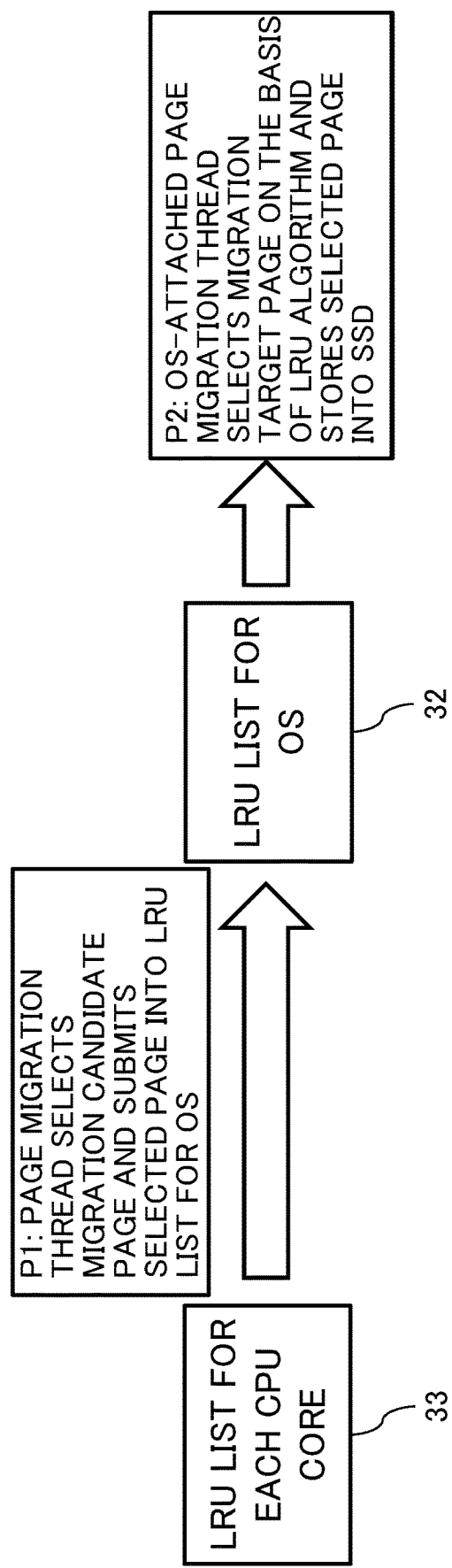
FIG. 3 is a diagram illustrating the operational relationship between an LRU list for each CPU core and an LRU list for OS in the computer system according to an example of the first embodiment.

FIG. 3 is a diagram illustrating the operational relationship between the LRU list 33 for each CPU core and the LRU list 32 for OS in the computer system 1a according to an example of the first embodiment.

The page migration thread 101 to be detailed below selects a migration target page from among multiple migration candidate pages managed by the LRU list 33 for each CPU core, and submits the selected migration target page into an LRU list 32 for OS to be migrated to the SSD 20 (see reference number P1 in FIG. 3).

An OS-attached page migration thread 102 to be detailed below selects a migration target page from among multiple migration candidate pages managed by the LRU list 33 for each CPU core, and migrates the selected migration target page to the SSD 20 (see reference number P2 in FIG. 3).

Figure 4:
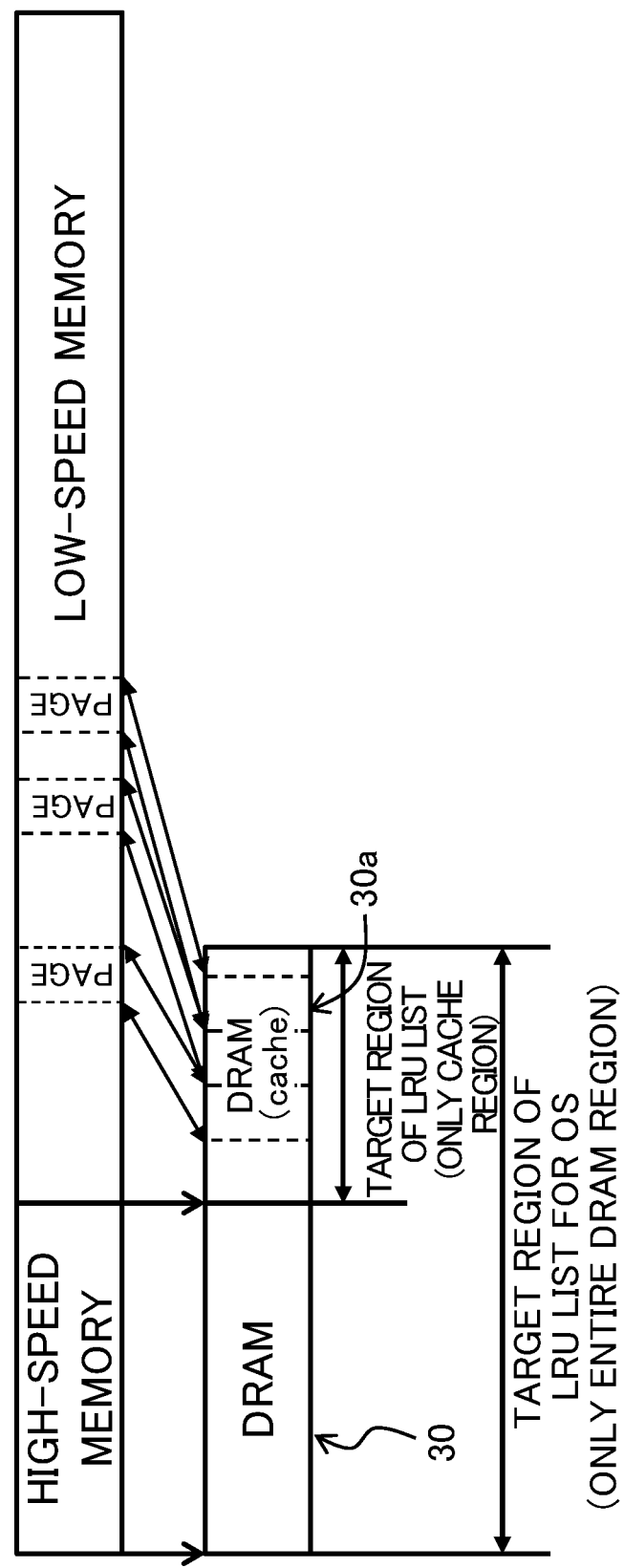
FIG. 4 is a diagram illustrating DRAM regions serving as targets of an LRU list for each CPU core and an LRU list for OS in the computer system according to an example of the first embodiment.

FIG. 4 is a diagram illustrating DRAM regions serving as targets of the LRU list 33 for each CPU core and the LRU list 32 for OS in the computer system 1a according to an example of the first embodiment.

As illustrated in FIG. 4, the LRU list 33 for each CPU core manages only the cache 30a. That is, only pages on the cache 30a are managed by the LRU list 33 for each CPU core.

On the other hand, the LRU list 32 for OS manages the entire storage region (entire DRAM region) of the DRAM 30. That is, the pages on the storing region of the DRAM 30 are managed by the LRU list 32 for OS.

Figure 5:
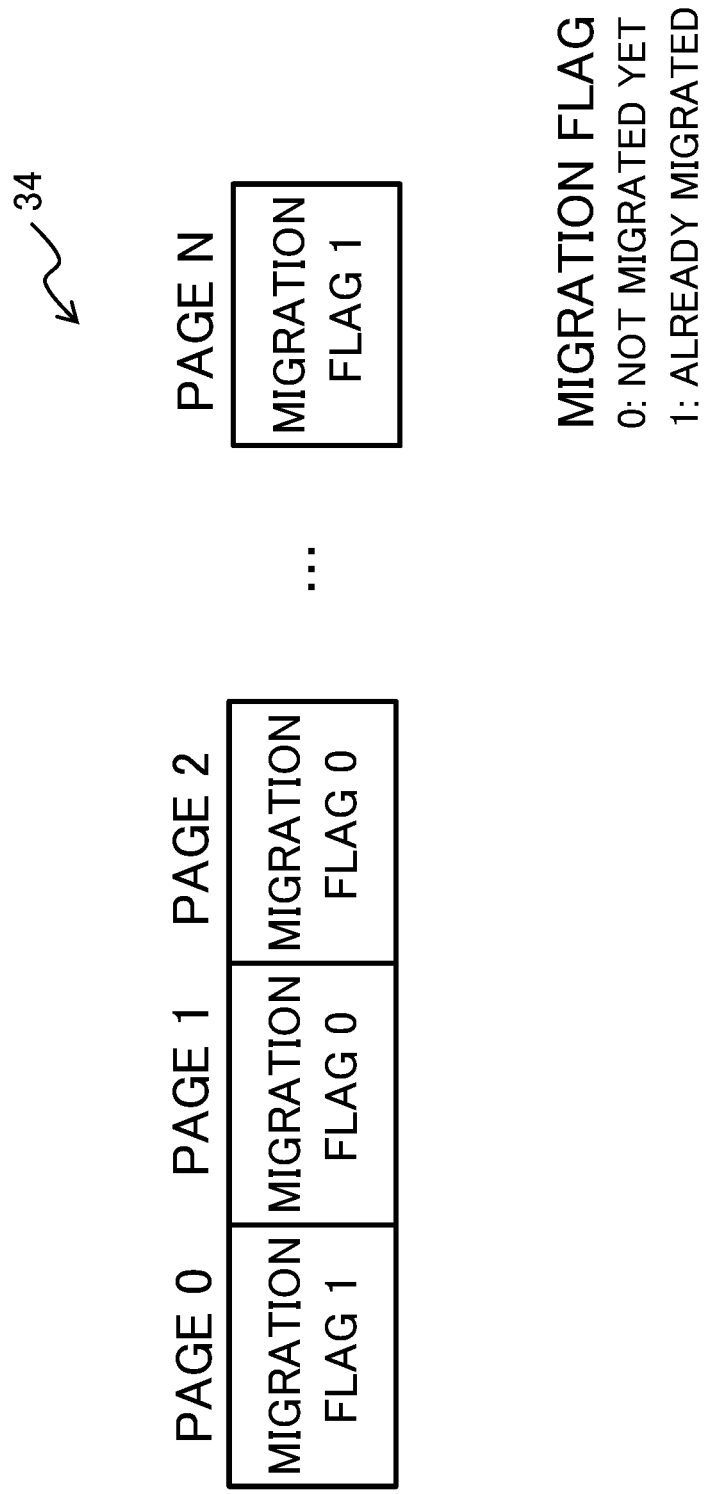
FIG. 5 is a diagram illustrating a migration data table in the computer system according to an example of the first embodiment.

FIG. 5 is a diagram illustrating the migration data table 34 in the computer system 1a according to an example of the first embodiment.

The migration data table 34 is information for managing whether or not a page has been migrated to the SSD 20, and is configured by associating each page with information indicating whether or not the page has been migrated to the SSD 20.

The migration data table 34 illustrated in FIG. 5 is configured by associating a migration flag with the information identifying a page. The information identifying a page may be an address of the page, or may be identification information set for each page, and may be variously modified.

The migration flag is information indicating whether or not the page has been migrated to the SSD 20, and, for example, is set to "0" when the page has not been migrated to the SSD 20 (not migrated yet) and is set to "1" when the page has been migrated to the SSD 20 (migrated). Namely, a page for the migration flag set to "1" in the migration data table 34 is a migrated page.

The migration data table 34 corresponds to migration management data managing a page that the OS-attached page migration thread 102 migrates from the SSD 20. The DRAM 30 that stores the migration data table 34 corresponds to a storing unit that stores the migration data table 34.

Figure 6:
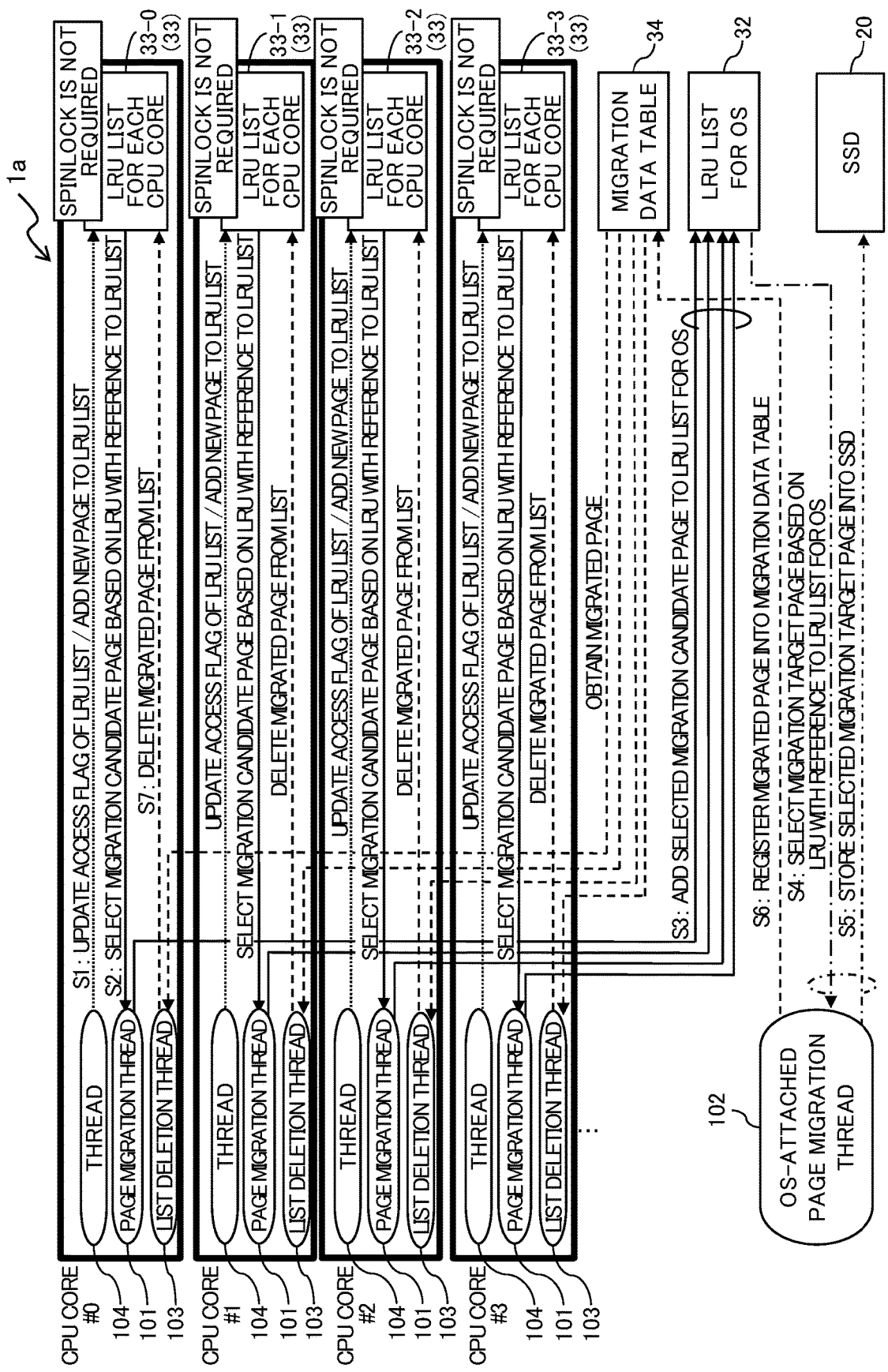
FIG. 6 is a diagram illustrating a method for managing a page in the computer system according to an example of the first embodiment.

FIG. 6 is a diagram illustrating a method for managing a page in the computer system 1a according to an example of the first embodiment.

The computer system 1a according to the first embodiment includes the LRU list 33 for each CPU core 11.

In the example illustrated in FIG. 6, the processor 10 is configured as a 4-core processor having the CPU cores #0 to #3.

In the computer system 1a of the first embodiment, it is assumed that the CPU cores 11 do not share data. Further, the LRU list 33 for each CPU core is controlled independently for each CPU core 11, and the OS-attached page migration thread 102 does not access to the LRU list 33 for each CPU.

In the computer system 1a according to the first embodiment, each of the CPU cores #0 to #3 executes a thread 104, the page migration thread 101, and a list deletion thread 103.

Further, among the CPU cores #0 to #3, for example, any one of the CPU cores 11 that has been set as the primary in advance executes the OS-attached page migration thread 102.

The migration data table 34 and the LRU list 32 for OS are stored in the kernel space 31 of the DRAM 30 (see FIG. 1).

As described above, the LRU lists 33 for each CPU core are provided one for each of the CPU cores 11. That is, the LRU list 33-0 for the CPU core #0 is provided for the CPU core #0; the LRU list 33-1 for the CPU core #1 is provided for the CPU core #1; the LRU list 33-2 for the CPU core #2 is provided for the CPU core #2; and the LRU list 33-3 for the CPU core #3 is provided for the CPU core #3.

Then, for example, the LRU list 33-0 for the CPU core #0 is accessed only from the thread 104, the page migration thread 101, and the list deletion thread 103 that the CPU core #0 executes.

This means that the LRU list 33-0 for the CPU core #0 is accessed only from the CPU core #0, and no access is made from the other CPU cores #1 to #3.

Similarly, the LRU list 33-1 for the CPU core #1 is accessed only from the thread 104, the page migration thread 101, and the list deletion thread 103 that the CPU core #1 executes. This means that the LRU list 33-1 for the CPU core #1 is accessed only from the CPU core #1, and no access is made from the other CPU cores #0, #2, and #3.

Besides, the LRU list 33-2 for the CPU core #2 is accessed only from the thread 104, the page migration thread 101, and the list deletion thread 103 that the CPU core #2 executes. This means that the LRU list 33-2 for the CPU core #2 is accessed only from the CPU core #2, and no access is made from the other CPU cores #0, #1, and #3

Further, the LRU list 33-3 for the CPU core #3 is accessed only from the thread 104, the page migration thread 101, and the list deletion thread 103 that the CPU core #3 executes. This means that the LRU list 33-3 for the CPU core #3 is accessed only from the CPU core #3, and no access is made from the other CPU cores #0 to #2.

Here, description will now be made in relation to a method for managing a page in the computer system 1a according to the first embodiment, focusing on an example of a process performed in the CPU core #0.

The CPU core #0 achieves arithmetic processing by executing the thread 104. The thread 104 performs processing such as updating the access flag and adding a new page to the LRU list 33-0 for the CPU core #0 (see reference number S1 in FIG. 6).

Hereinafter, to achieve a somewhat process by the CPU core 11 executing the thread 104 is sometimes referred to as the thread 104 achieving the process.

The CPU core #0, by executing the page migration thread 101, refers to the LRU list 33-0 for the CPU core #0 and selects a migration candidate page from among pages registered in the LRU list 33 for the CPU core #0 on the basis of the LRU algorithm (see reference number S2 in FIG. 6).

Hereinafter, to achieve a somewhat process by the CPU core 11 executing the page migration thread 101 is sometimes referred to as the page migration thread 101 achieving the process.

The page migration thread 101 adds the selected migration candidate page to the LRU list 32 for OS (see reference number S3 in FIG. 6).

The CPU core 11, by executing the OS-attached page migration thread 102, refers to the LRU list 32 for OS and selects a migration target page from among migration candidate pages registered in the LRU list 32 for OS on the basis of the LRU algorithm (see reference number S4 in FIG. 6). Hereinafter, to achieve a somewhat process by the CPU core 11 executing the OS-attached page migration thread 102 is sometimes referred to as the OS-attached page migration thread 102 achieving the process.

Then the OS-attached page migration thread 102 migrates the selected migration target page to the SSD 20 (see reference number S5 in FIG. 6).

The CPU core 11 that executes the OS-attached page migration thread 102 corresponds to a migration processor that migrates data of the page selected from the group of the LRU list 32 for OS from the cache 30a to the SSD 20.

The OS-attached page migration thread 102 registers the page (migrated page) migrated to the SSD 20 in migration data table 34 (see reference number S6 in FIG. 6). For example, the OS-attached page migration thread 102 sets (flags) the migration flag of the page in the migration data table 34 to "1".

The CPU core #0 deletes, by executing the list deletion thread 103 thereof, a page the migration flag of which is set to "1" in the migration data table 34 among the pages in the LRU list 33 for the CPU core #0. Hereinafter, to achieve a somewhat process by the CPU core 11 executing the list deletion thread 103 is sometimes referred to as the list deletion thread 103 achieving the process.

Specifically, the list deletion thread 103 refers to the migration data table 34, and compares the migrated page registered in this migration data table 34 with a migration candidate page registered in the LRU list 33-0 for the CPU core #0 that the CPU core #0 itself manages. Then, from among the migration candidate pages registered in the LRU list 33-0 for the CPU core #0, the CPU core #0 deletes a page that matches the migrated page registered in the migration data table 34.

The list deletion thread 103 grasps the migrated page by referring to the migration data table 34, and deletes the migrated page from the LRU list 33 for each CPU core (see reference number S7 in FIG. 6). Alternatively, the process by the list deletion thread 103 described above may be performed by the page migration thread 101. Since access to the migration data table 34 is achieved by a light exclusive process, so that atomic access can be achieved.

The CPU core 11 that executes the list deletion thread 103 is provided for each of multiple CPU cores 11, and corresponds to a deleting processor that deletes a page migrated to the SSD 20 from the LRU list 33 for each CPU core with reference to the migration data table 34. The deleting processor is provided for each CPU core 11.

The remaining CPU cores 11 execute the process similarly.

Figure 7:
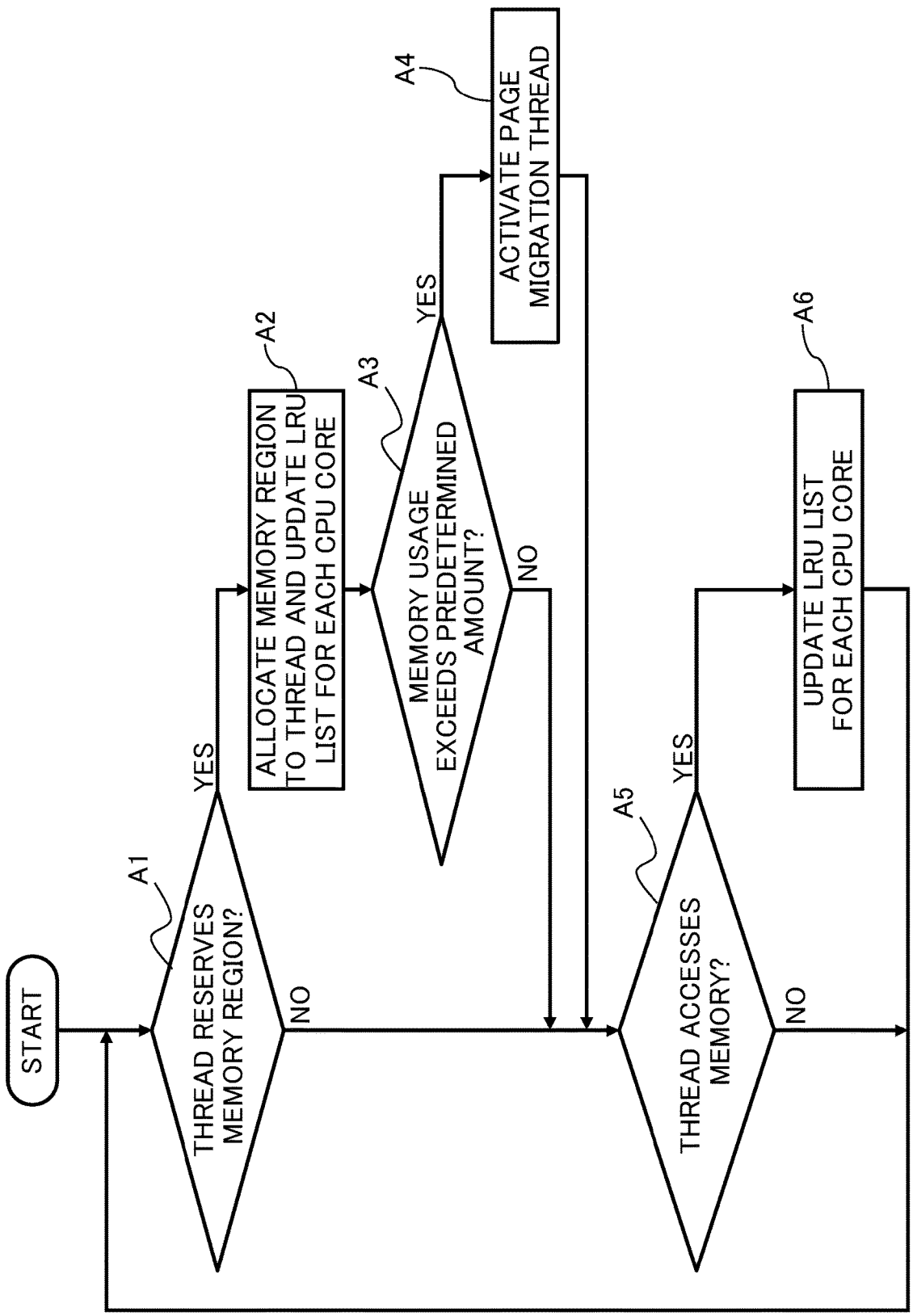
FIG. 7 is a flowchart illustrating a process of updating an LRU list for each CPU core by a thread in the computer system according to an example of the first embodiment.

(B) Operation:

Description will now be made in relation to the process of updating the LRU list 33 for each CPU core by the thread 104 in the computer system 1a according to an example of the first embodiment configured as described above with reference to the flowchart (Steps A1 to A6) illustrated in FIG. 7.

In Step A1, the thread 104 determines whether to reserve a page in a memory region. As a result of the determination, in cases where the page is to be reserved (see YES route in Step A1), the process proceeds to Step A2.

In Step A2, the thread 104 allocates the page to the thread 104 and updates the LRU list 33 for each CPU core.

In Step A3, the thread 104 determines whether a memory usage exceeds a predetermined threshold (a certain amount). As a result of the determination, in cases where the memory usage exceeds the certain amount (see YES route in Step A3), the thread 104 activates the page migration thread 101 in Step A4.

Then, the process proceeds to Step A5. Further, as a result of the determination in Step A1, also in cases where the thread 104 does not reserve a page in the memory region (see NO route in Step A1), the process proceeds to Step A5.

In Step A5, the thread 104 determines whether to access the memory. As a result of the determination, in cases where the thread 104 accesses the memory (see YES route in Step A5), the process proceeds to Step A6 to update the LRU list 33 for each CPU core. Then, the process returns to Step A1.

As a result of the determination in Step A3, in cases where the memory usage does not exceed the predetermined value (see NO route in Step A3), the process proceeds to Step A5.

As a result of the determination in Step A5, in cases where the thread 104 does not access the memory (see NO route in Step A5), the process returns to Step A1.

Figure 8:
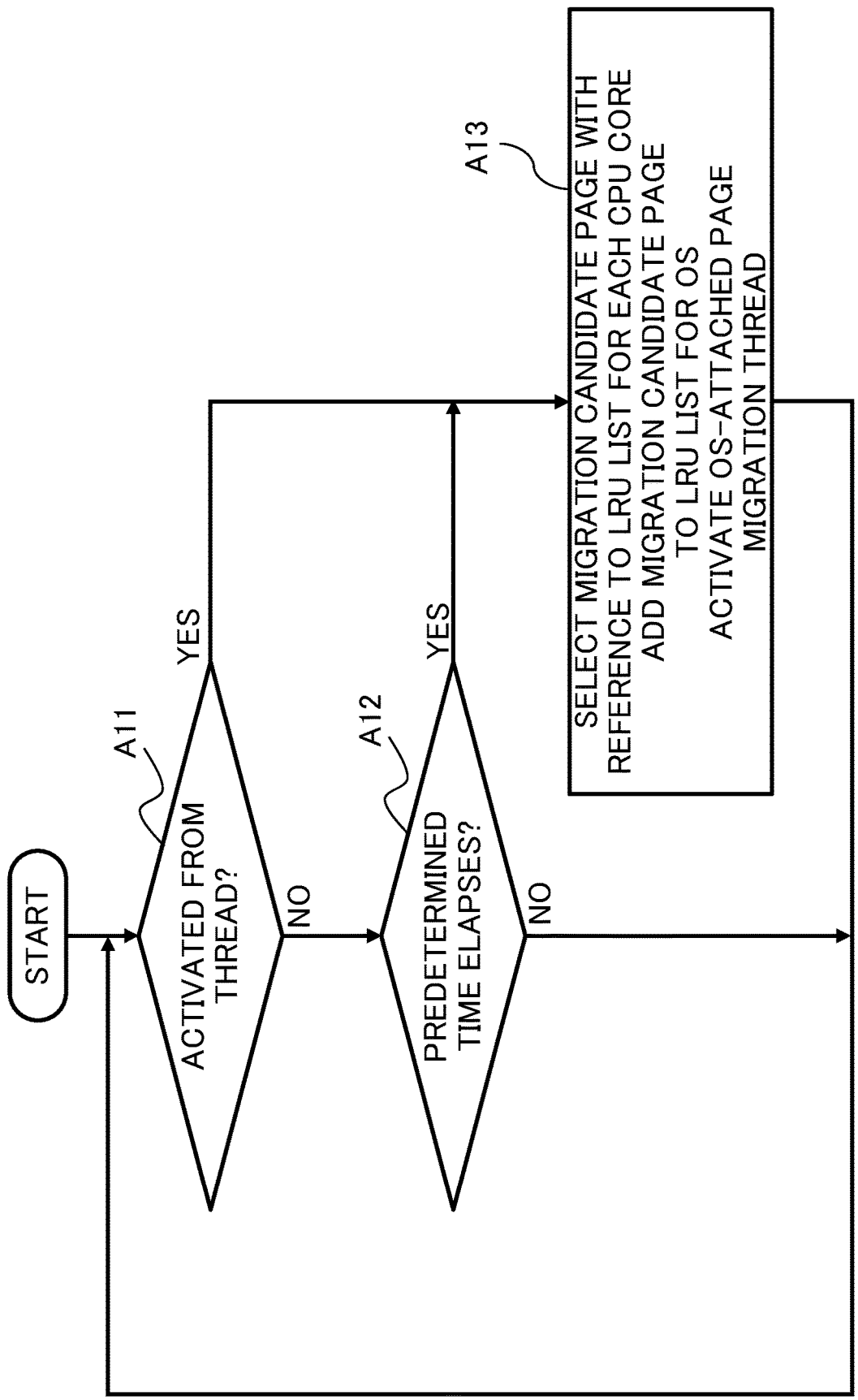
FIG. 8 is a flowchart illustrating a process performed by a page migration thread in the computer system according to an example of the first embodiment.

Next, description will now be made in relation to the process performed by the page migration thread 101 in the computer system 1a according to an example of the first embodiment with reference to the flowchart (Steps A11 to A13) illustrated in FIG. 8. Concurrently with the activation of the page migration thread 101, the time counting by a non-illustrated timer is started.

In Step A11, the page migration thread 101 determines whether to be activated from the thread 104 executed by a CPU core 11 (local CPU core 11) the same as the CPU core 11 that is executing the page migration thread 101 itself. As a result of the determination, in cases where the page migration thread 101 is activated from the thread 104 (see YES route in Step A11), the process proceeds to Step A13.

In Step A13, the page migration thread 101 refers to the LRU list 33 for each CPU core and selects a migration candidate page based on the LRU algorithm. In addition, the page migration thread 101 adds the selected migration candidate page to the LRU list 32 for OS. At this timing, the timer may be reset.

The page migration thread 101 activates the OS-attached page migration thread 102. After that, the process returns to Step A11.

Further, as a result of the determination in Step A11, in cases where the page migration thread 101 is not activated from the thread 104 but is activated due to, for example, cancelling sleep (see NO route in Step A11), the process proceeds to Step A12.

In Step A12, the page migration thread 101 determines, with reference to the time counted by the timer, whether a predetermined time elapses. Here, in cases where the predetermined time does not elapse (see NO route in Step A12), the process returns to Step A11.

In contrast, in cases where the predetermined time elapses (see YES route in Step A12), the process proceeds to Step A13.

Figure 9:
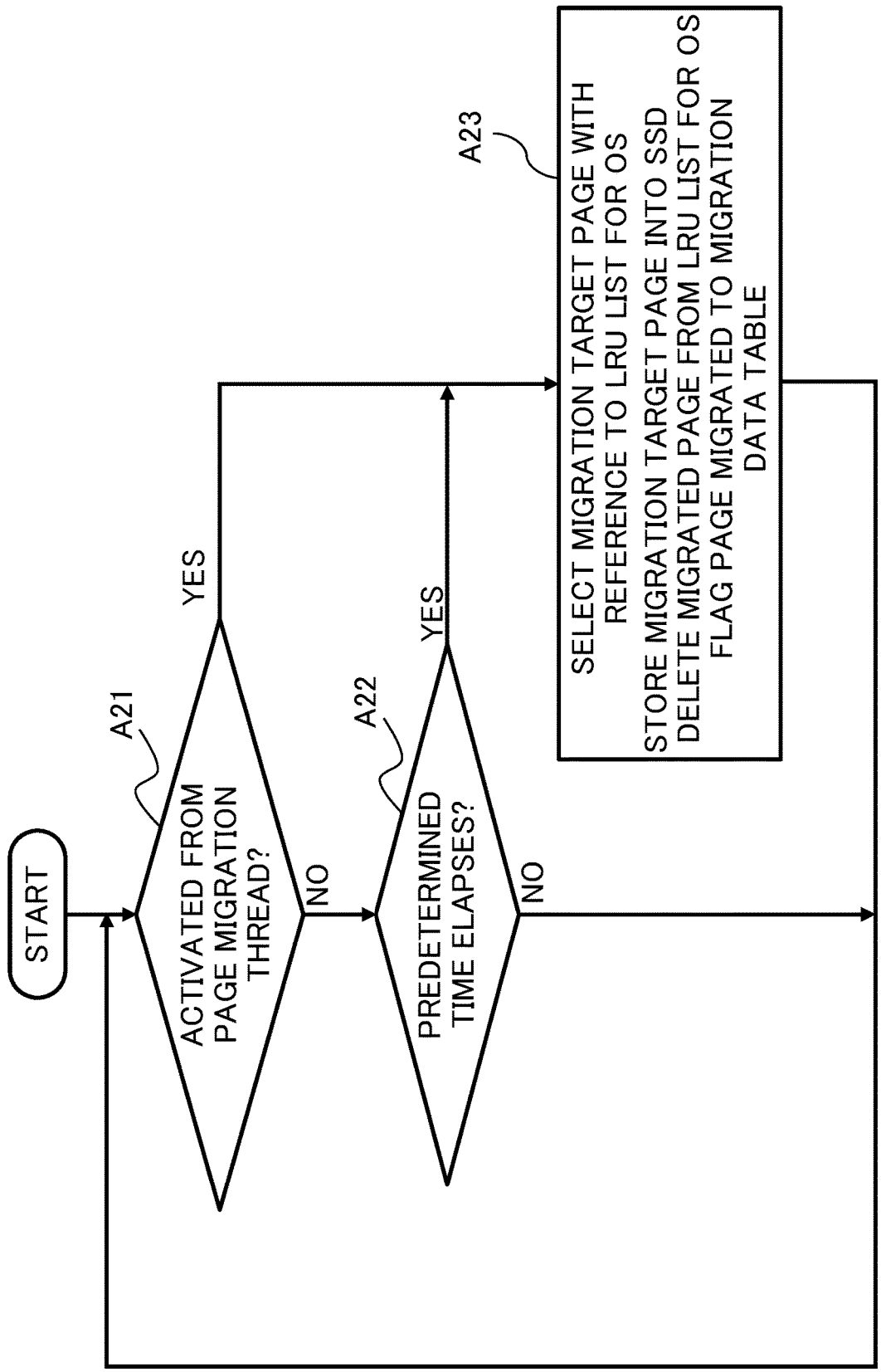
FIG. 9 is a flowchart illustrating process performed by an OS-attached page migration thread in the computer system according to an example of the first embodiment.

Next, description will now be made in relation to the process performed by the OS-attached page migration thread 102 in the computer system 1a according to an example of the first embodiment with reference to the flowchart (Steps A21 to A23) illustrated in FIG. 9. Concurrently with the activation of the OS-attached page migration thread 102, the time counting by a non-illustrated timer is started.

In Step A21, the OS-attached page migration thread 102 determines whether to be activated from the page migration thread 101 itself. As a result of the determination, in cases where the OS-attached page migration thread 102 is activated from the page migration thread 101 (see YES route in Step A21), the process proceeds to Step A23.

In Step A23, the OS-attached page migration thread 102 refers to the LRU list 32 for OS and selects a migration target page based on the LRU algorithm. The OS-attached page migration thread 102 stores the selected migration target page in the SSD 20 and deletes the pages that have been migrated to the SSD 20 from the LRU list 32 for OS.

In addition, the OS-attached page migration thread 102 sets a migration flag in the migration data table 34 of the page migrated to the SSD 20 to a value indicating that the page has been already migrated. At this timing, the timer may be reset.

The page migration thread 101 activates the OS-attached page migration thread 102. Then, the process returns to Step A21.

Further, as a result of the determination in Step A21, in cases where the OS-attached page migration thread 102 is not activated from the page migration thread 101 but is activated due to, for example, cancelling sleep (see NO route in Step A21), the process proceeds to Step A22.

In Step A22, the OS-attached page migration thread 102 determines, with reference to the time counted by the timer, whether a predetermined time elapses. Here, in cases where the predetermined time does not elapse (see NO route in Step A22), the process returns to Step A21.

In contrast, in cases where the predetermined time elapses (see YES route in Step A22), the process proceeds to Step A23.

Figure 10:
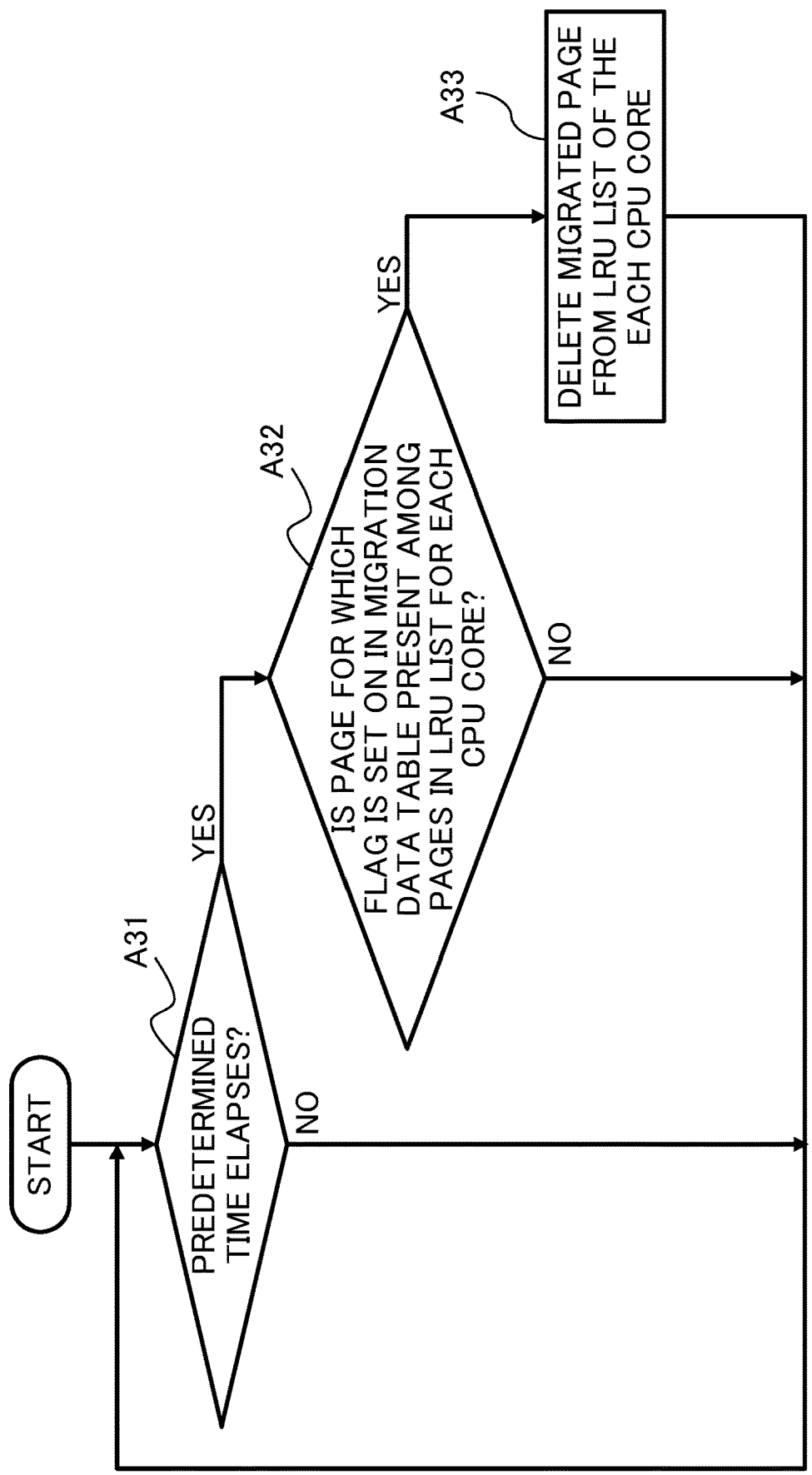
FIG. 10 is a flowchart illustrating a process performed by a list deletion thread in the computer system according to an example of the first embodiment.

Next, description will now be made in relation to the process performed by the list deletion thread 103 in the computer system 1a according to an example of the first embodiment with reference to the flowchart (Steps A31 to A33) illustrated in FIG. 10. Concurrently with the activation of the list deletion thread 103, the time counting by a non-illustrated timer is started.

In Step A31, the list deletion thread 103 determines, with reference to the time counted by the timer, whether a predetermined time elapses. Here, in cases where the predetermined time does not elapse (see NO route in Step A31), the process returns to Step A31.

In contrast, in cases where the predetermined time elapses (see YES route in Step A31), the process proceeds to Step A32.

In step A32, the list deletion thread 103 determines whether a page the migration flag of which is set to "1" in the migration data table 34 is present among the pages in the LRU list 33 for each CPU core of the local CPU core 11. As a result of the determination, in cases where a page the migration flag of which is set to "1" in the migration data table 34 is not present among the pages in the LRU list 33 for each CPU core of the local CPU core 11 (see NO route in Step A32), the process returns to Step A31.

In contrast, as a result of the determination in Step A32, in cases where a page the migration flag of which is set to "1" in the migration data table 34 is present among the pages in the LRU list 33 for each CPU core of the local CPU core 11 (see YES route in Step A32), the process proceeds to Step A33.

In Step A33, the list deletion thread 103 deletes the page (migrated page) the migration flag of which is set to "1" in the migration data table 34 from the pages in the LRU list 33 for each CPU core of the local CPU core 11. Then, the process returns to Step A31.

The remaining CPU cores 11 execute the process similarly.

(C) Effects:

As the above, according to the computer system 1a of an example of the first embodiment, the LRU lists 33 for each CPU core are distributedly provided for the respective CPU cores 11 and also the multiple LRU lists 33 for each CPU core are independently of one another controlled for each CPU core 11. With this configuration, the LRU list 33 for each CPU core is only accessed from the local CPU core 11 but is inaccessible from the remaining CPU cores 11. This eliminates the need for exclusive control over each LRU list 33 for each CPU core and accordingly eliminates the need for spinlock. This reduces the load on the processor 10 due to the page migration process and enhances the performance of the application.

In each CPU core 11, the list deletion thread 103 can easily grasp the migrated page to the SSD 20 simply by referring to the corresponding migration flag in the migration data table 34, so that it is possible to delete the migrated page from the LRU list 33 for each CPU core.

Figure 11:
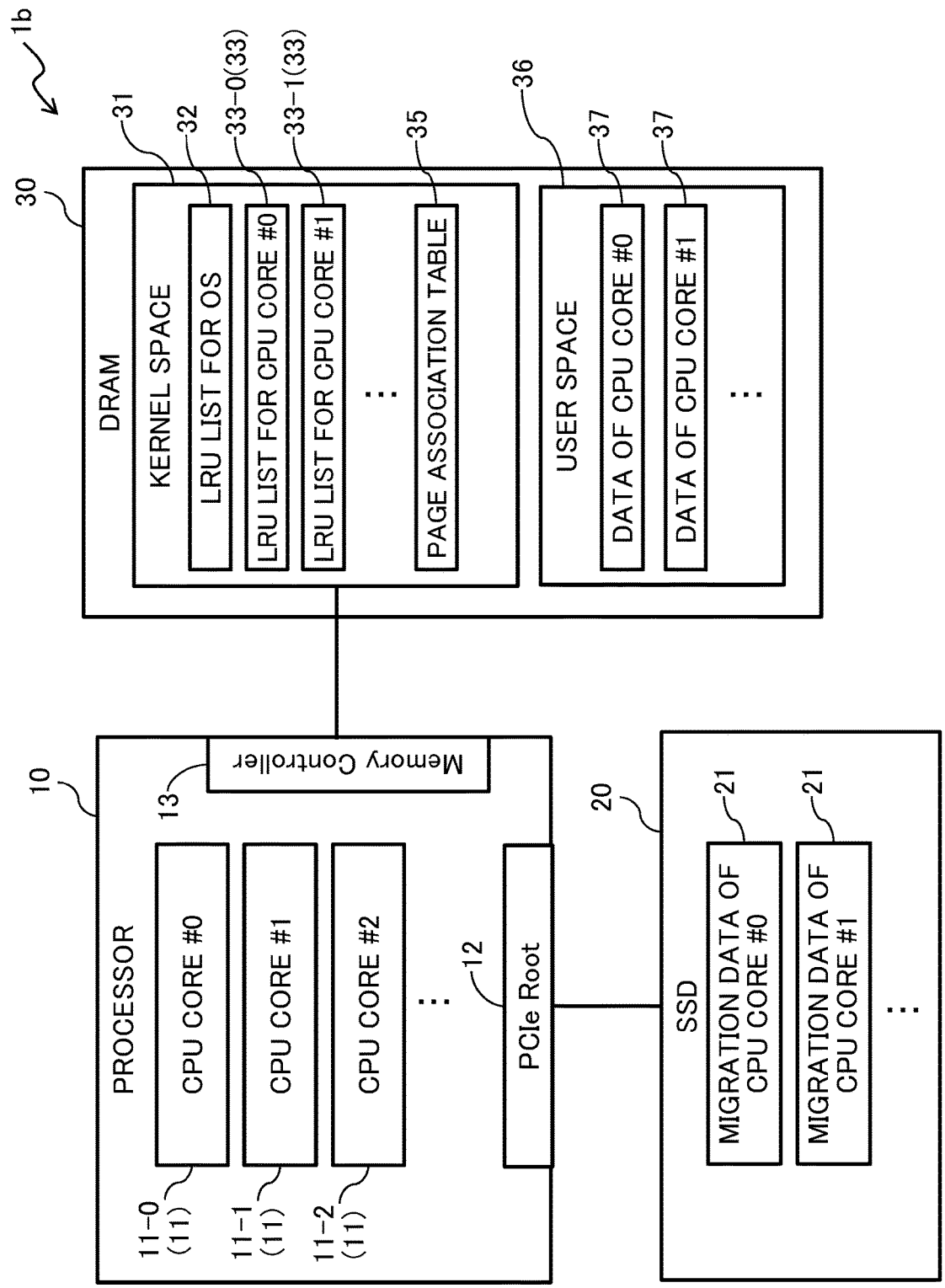
FIG. 11 is a diagram schematically illustrating a configuration of a computer system according to an example of a second embodiment.

2. Second Embodiment (A) Configuration:

FIG. 11 is a diagram schematically illustrating a configuration of a computer system 1b according to an example of a second embodiment.

As illustrated in FIG. 11, the computer system 1b according to the second embodiment includes a page association table 35 in place of the migration data table 34 of the DRAM 30 of the first embodiment, and the remaining elements are configured the same as the computer system 1a of the first embodiment. Hereinafter, like reference numbers designate same or substantially same elements described above, so repetitious description is omitted here.

Figure 12:
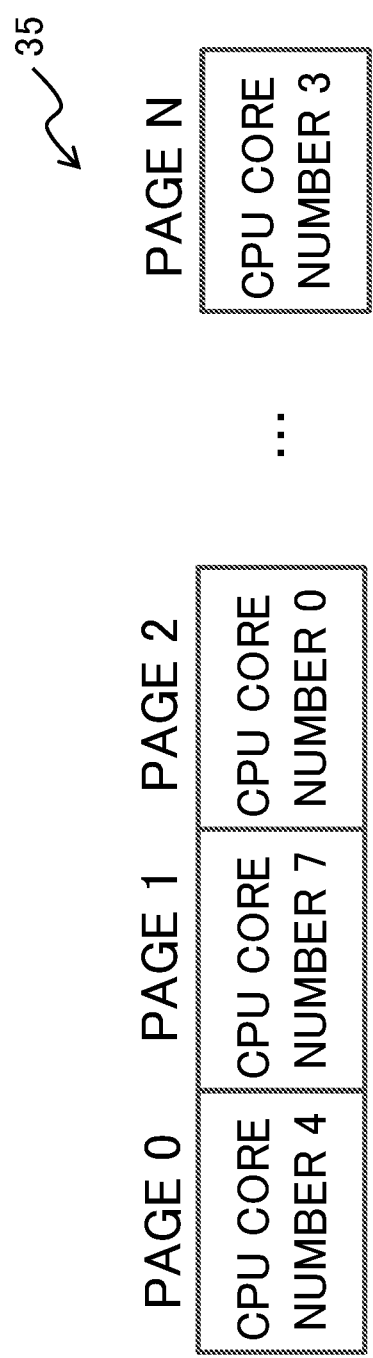
FIG. 12 is a diagram illustrating a page association table in the computer system according to an example of the second embodiment.

FIG. 12 is a diagram schematically illustrating a configuration of the page association table 35 of the computer system 1b according to an example of the second embodiment —Page Association Table 35—

The page association table 35 is information that associates a page with the CPU core 11, and indicates the LRU list 33 for each CPU core of which CPU core 11 registers therein a migration candidate page selected by the page migration thread 101.

The page association table 35 illustrated in FIG. 12 is configured by associating each page with the CPU core 11 (CPU core number) that manages the page by the LRU list 33 for each CPU.

By referring to the page association table 35, the OS-attached page migration thread 102 specifies the CPU core 11 associated with the migrated page to the SSD 20, and deletes the migration candidate page from the LRU list 33 for each CPU core of the specified CPU core 11.

For example, the OS-attached page migration thread 102 executed by the primary CPU core 11 can access the LRU lists 33 for each CPU core managed by the other CPU cores 11 by referring to the page association table 35. An access to the page association table 35 can be made by a light exclusive process, so that atomic access can be achieved.

A CPU core number associated with a page in the page association table 35 corresponds to position data of the LRU list 33 for each CPU core associated with the migration candidate page.

The page association table 35 corresponds to page association data that associates the page migrated to the SSD 20 with the CPU core 11. The DRAM 30 that stores the page association table 35 corresponds to a storing unit.

Figure 13:
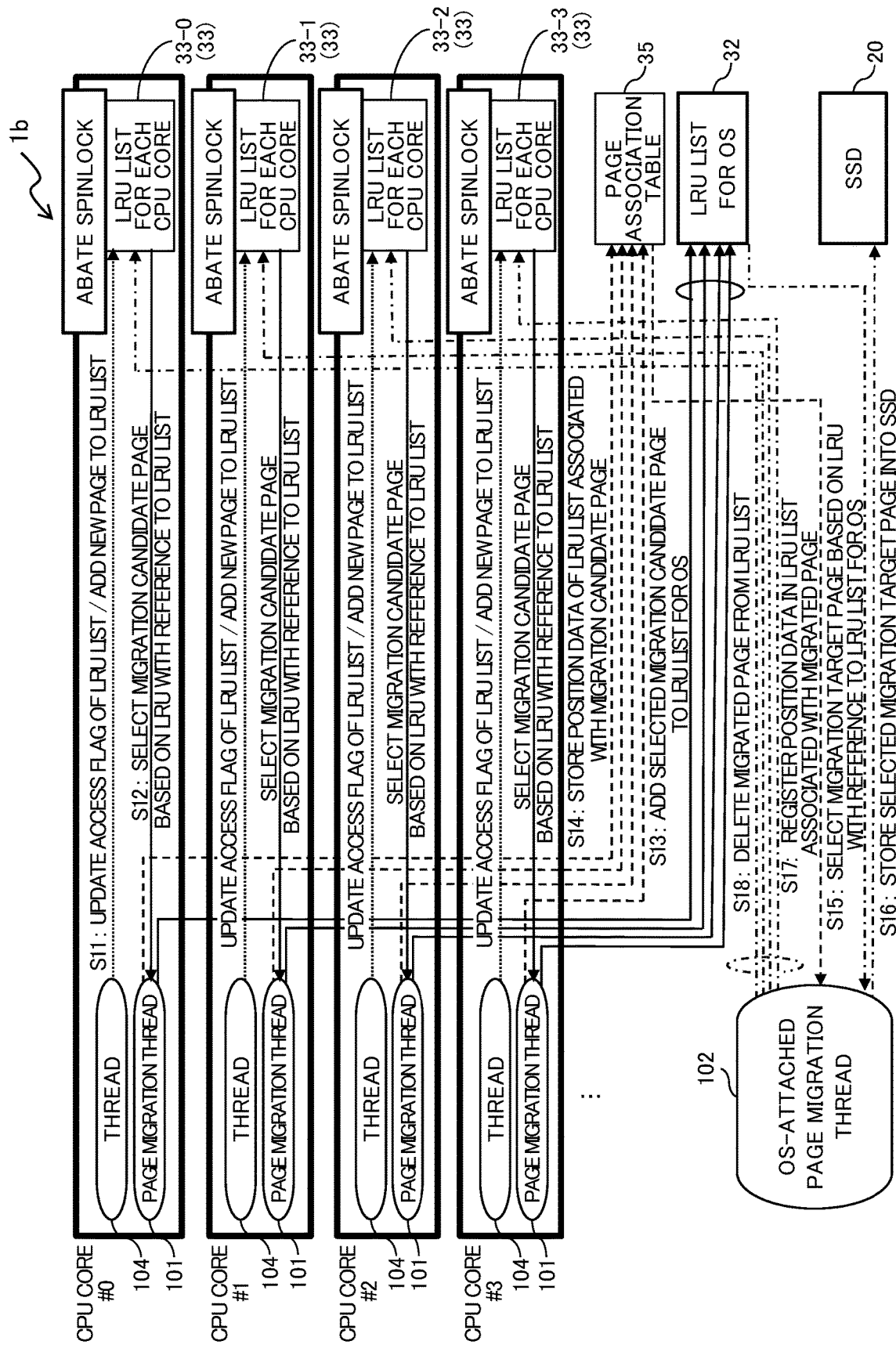
FIG. 13 is a diagram illustrating a method for managing a page in the computer system according to an example of the second embodiment.

FIG. 13 is a diagram illustrating a method for managing a page in the computer system 1b according to an example of the second embodiment.

The computer system 1b according to the second embodiment also includes the LRU list 33 for each CPU core 11.

In the example illustrated in FIG. 13, the processor 10 is configured as a 4-core processor having the CPU cores #0 to #3.

In the computer system 1b of the second embodiment, it is assumed that the CPU cores 11 do not share data.

In the computer system 1b according to the second embodiment, each of the CPU cores #0 to #3 executes the thread 104 and the page migration thread 101.

Further, among the CPU cores #0 to #3, for example, any one of the CPU cores 11 set as the primary in advance executes the OS-attached page migration thread 102.

The page association table 35 and the LRU list 32 for OS are stored in the kernel space 31 of the DRAM 30.

Further, the LRU lists 33 for each CPU core are provided one for each of the CPU cores 11. That is, the LRU list 33-0 for the CPU core #0 is provided for the CPU core #0; the LRU list 33-1 for the CPU core #1 is provided for the CPU core #1; the LRU list 33-2 for the CPU core #2 is provided for the CPU core #2; and the LRU list 33-3 for the CPU core #3 is provided for the CPU core #3.

Then, for example, the LRU list 33-0 for the CPU core #0 is accessed from the thread 104 and the page migration thread 101 that the CPU core #0 executes. Further, the LRU list 33-0 for the CPU core #0 is accessed from the OS-attached page migration thread 102 in order to delete a migration candidate page.

Similarly, the LRU list 33-1 for the CPU core #1 is accessed from the thread 104 and the page migration thread 101 that the CPU core #1 executes and accessed from the OS-attached page migration thread 102 in order to delete a migration candidate page.

Furthermore, the LRU list 33-2 for the CPU core #2 is accessed from the thread 104 and the page migration thread 101 that the CPU core #2 executes and accessed from the OS-attached page migration thread 102 in order to delete a migration candidate page.

Still furthermore, the LRU list 33-3 for the CPU core #3 is accessed from the thread 104 and the page migration thread 101 that the CPU core #3 executes and accessed from the OS-attached page migration thread 102 in order to delete a migration candidate page.

Here, description will now be made in relation to a method for managing a page in the computer system 1b according to the second embodiment, focusing on an example of a process performed in the CPU core #0.

The CPU core #0 achieves arithmetic processing by executing the thread 104. The thread 104 performs processing such as updating the access flag and adding a new page to the LRU list 33-0 for the CPU core #0 (see reference number S11 in FIG. 13).

The CPU core #0 refers to the LRU list 33-0 for the CPU core #0 and selects a migration candidate page from among pages registered in the LRU list 33-0 for the CPU core #0 on the basis of the LRU algorithm by executing the page migration thread 101 (see reference number S12 in FIG. 13).

The page migration thread 101 adds the selected migration candidate page to the LRU list 32 for OS (see reference number S13 in FIG. 13).

Further, the page migration thread 101 registers the CPU core number (position data of the LRU list 32 for OS) associated with the migration candidate page into the page association table 35 (see reference number S14 in FIG. 13).

By executing the OS-attached page migration thread 102, the CPU core 11 refers to the LRU list 32 for OS, and selects a migration target page from among migration candidate pages registered in the LRU list 32 for OS on the basis of the LRU algorithm (see reference number S15 in FIG. 13). Then, the OS-attached page migration thread 102 migrates the selected migration target page to the SSD 20 (see reference number S16 in FIG. 13).

The OS-attached page migration thread 102 obtains the CPU core number (the position data of the LRU list 32 for OS) associated with the migrated page with reference to the page association table 35 (see reference number S17 in FIG. 13). The OS-attached page migration thread 102 deletes the migrated page from the LRU list 33 for the CPU core of the CPU core 11 having the CPU core number obtained from the page association table 35 (see reference number S18 in FIG. 13).

In the computer system 1b according to the second embodiment, the OS-attached page migration thread 102 corresponds to a deleting processor that deletes, from the LRU list 33 for each CPU core, the page migrated to the SSD 20 with reference to the page association table 35.

The remaining CPU cores 11 execute the process similarly.

Figure 14:
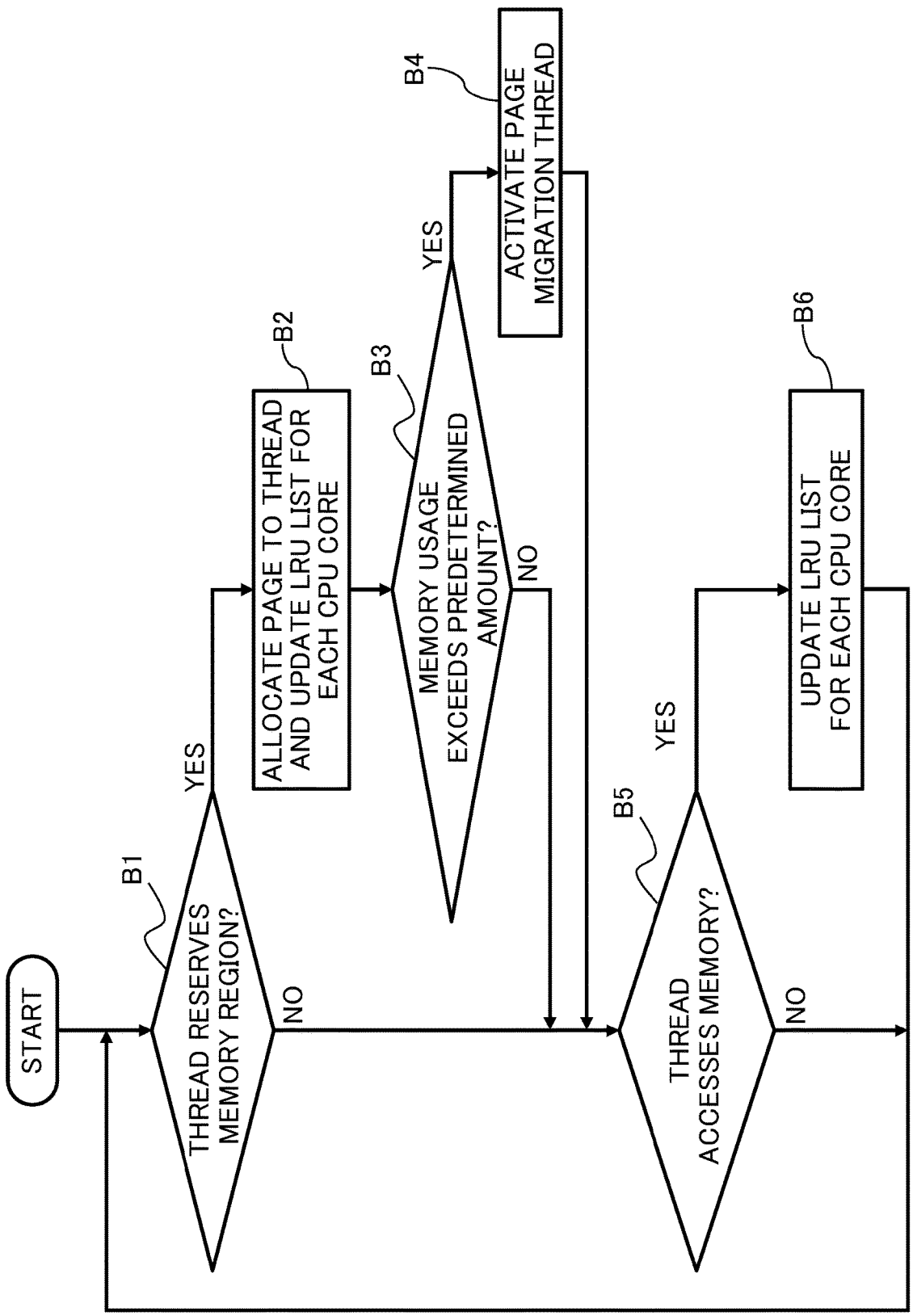
FIG. 14 is a flowchart illustrating a process of updating an LRU list for each CPU core by a thread in the computer system according to an example of the second embodiment.

(B) Operation:

Description will now be made in relation to the process of updating the LRU list 33 for each CPU core by the thread 104 in the computer system 1b according to an example of the second embodiment configured as described above with reference to the flowchart (Steps B1 to B6) illustrated in FIG. 14.

In Step B1, the thread 104 determines whether to reserve a page in a memory region. As a result of the determination, in cases where the page is to be reserved (see YES route in Step B1), the process proceeds to Step B2.

In Step B2, the thread 104 allocates the page to the thread 104 and updates the LRU list 33 for each CPU core.

In Step B3, the thread 104 determines whether a memory usage exceeds a predetermined threshold (a certain amount). As a result of the determination, in cases where the memory usage exceeds the certain amount (see YES route in Step B3), the thread 104 activates the page migration thread 101 in Step B4.

Then, the process proceeds to Step B5. Further, as a result of the determination in Step B1, in cases where the thread 104 does not reserve a page in the memory region (see NO route in Step B1), also the process proceeds to Step B5.

In Step B5, the thread 104 determines whether the memory is accessed. As a result of the determination, in cases where a memory access is made (see YES route in Step B5), the process proceeds to Step B6 to update the LRU list 33 for each CPU core. Then, the process returns to Step B1.

As a result of the determination in Step B3, in cases where the memory usage does not exceed the predetermined value (see NO route in Step B3), the process proceeds to Step B5.

As a result of the determination in Step B5, in cases where a memory access is not made (see NO route in Step B5), the process returns to Step B1.

Figure 15:
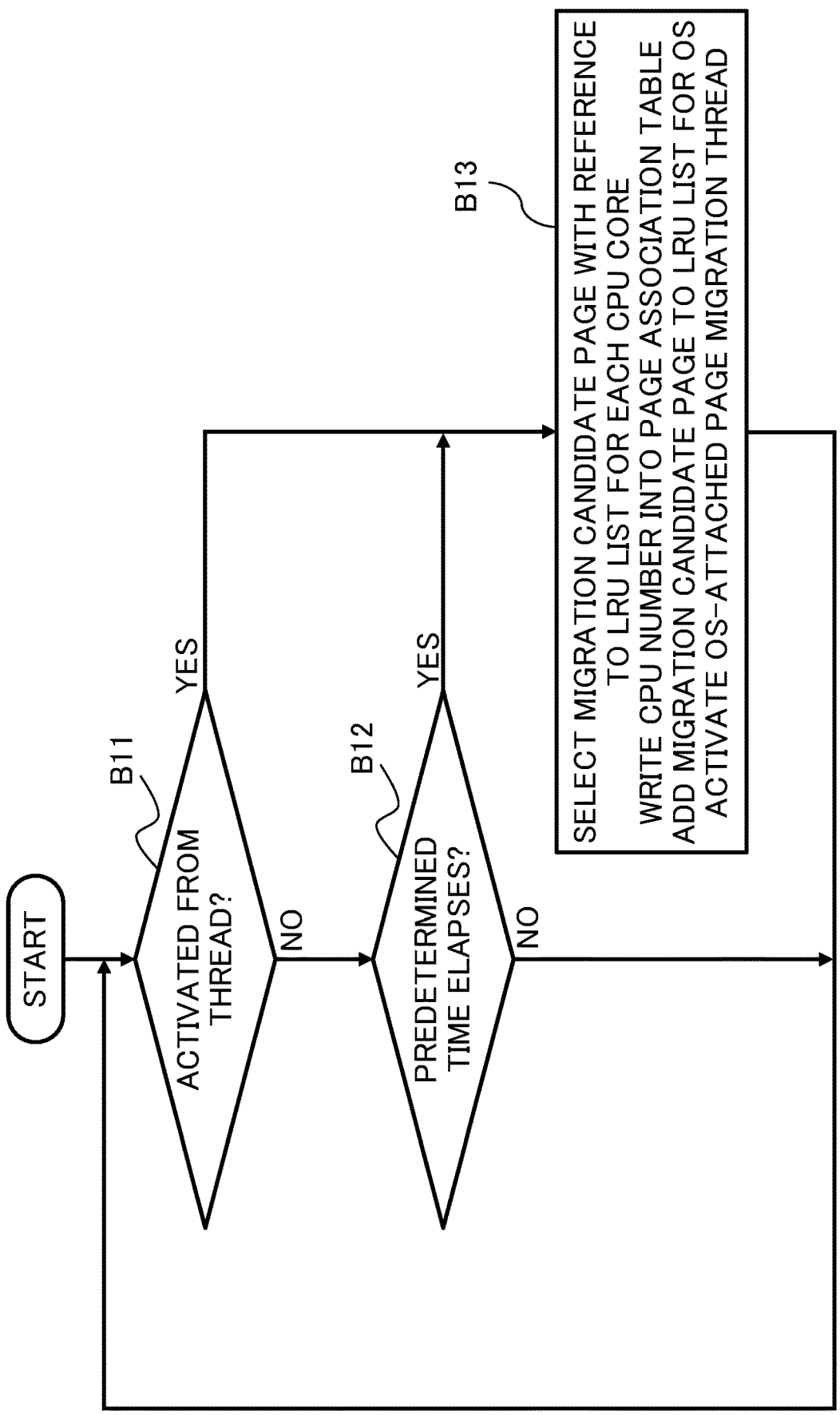
FIG. 15 is a flowchart illustrating a process performed by a page migration thread in the computer system according to an example of the second embodiment.

Next, description will now be made in relation to the process performed by the page migration thread 101 in the computer system 1b according to an example of the second embodiment with reference to the flowchart (Steps B11 to B13) illustrated in FIG. 15. Concurrently with the activation of the page migration thread 101, the time counting by a non-illustrated timer is started.

In Step B11, the page migration thread 101 determines whether to be activated from the thread 104 executed by a CPU core 11 (local CPU core 11) the same as the CPU core 11 that is executing the page migration thread 101 itself. As a result of the determination, in cases where the page migration thread 101 is activated from the thread 104 (see YES route in Step B11), the process proceeds to Step B13.

In Step B13, the page migration thread 101 selects a migration candidate page based on the LRU algorithm with reference to the LRU list 33 for each CPU core. Further, the page migration thread 101 registers the CPU core number (position data of the LRU list 32 for OS) associated with the migration candidate page into the page association table 35.

In addition, the page migration thread 101 adds the selected migration candidate page to the LRU list 32 for OS. At this timing, the timer may be reset.

The page migration thread 101 activates the OS-attached page migration thread 102. Then, the process returns to Step B11.

Further, as a result of the determination in Step B11, in cases where the page migration thread 101 is not activated from the thread 104 but is activated due to, for example, cancelling sleep (see NO route in Step B11), the process proceeds to Step B12.

In Step B12, the page migration thread 101 determines, with reference to the time counted by the timer, whether a predetermined time elapses. Here, in cases where the predetermined time does not elapse (see NO route in Step B12), the process returns to Step B11.

In contrast, in cases where the predetermined time elapses (see YES route in Step B12), the process proceeds to Step B13.

Figure 16:
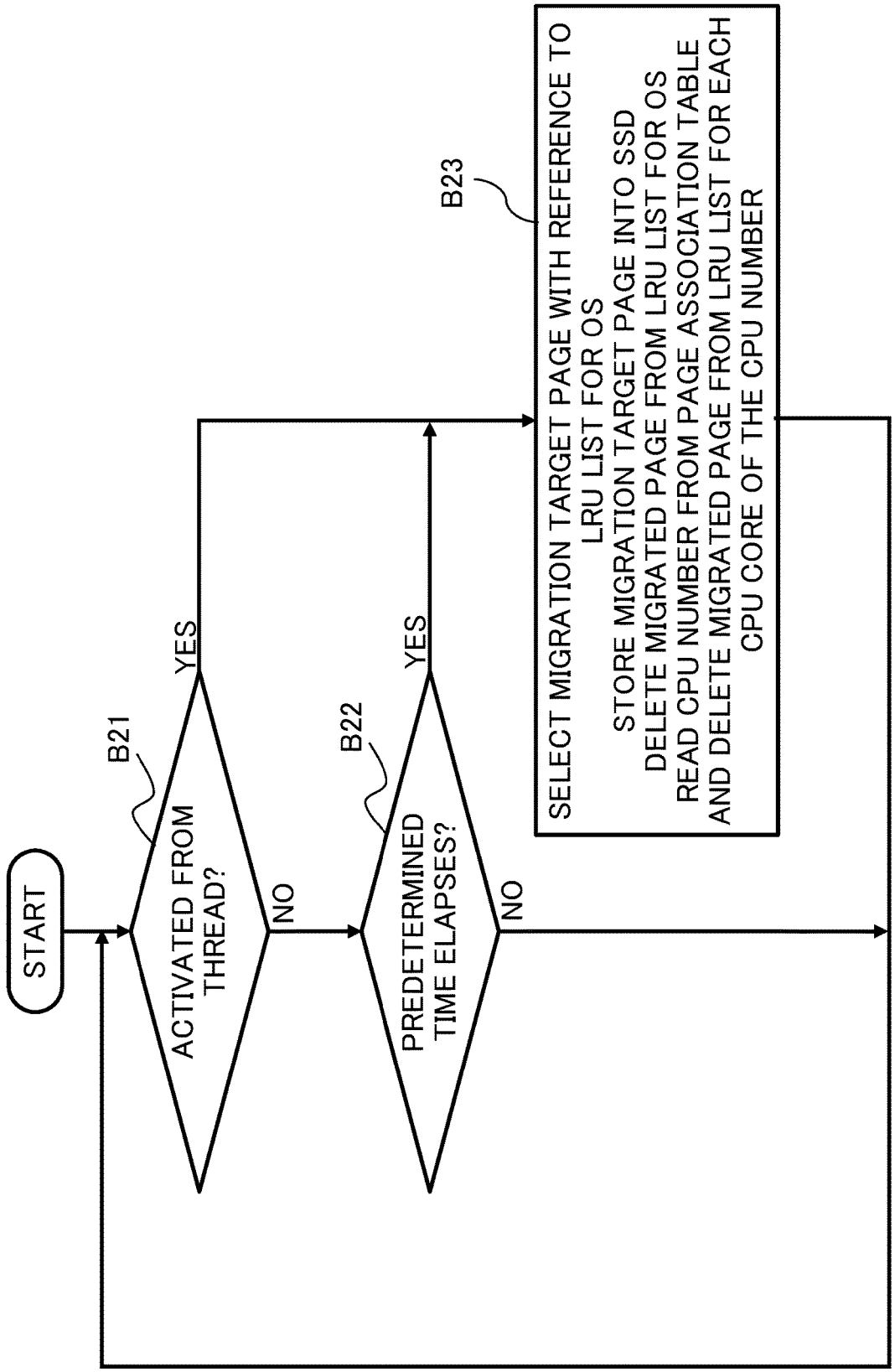
FIG. 16 is a flowchart illustrating a process performed by an OS-attached page migration thread in the computer system according to an example of the second embodiment.

Next, description will now be made in relation to the process performed by the OS-attached page migration thread 102 in the computer system 1b according to an example of the second embodiment with reference to the flowchart (Steps B21 to B23) illustrated in FIG. 16. Concurrently with the activation of the OS-attached page migration thread 102, the time counting by a non-illustrated timer is started.

In Step B21, the OS-attached page migration thread 102 determines whether to be activated from the page migration thread 101 itself. As a result of the determination, in cases where the OS-attached page migration thread 102 is activated from the page migration thread 101 (see YES route in Step B21), the process proceeds to Step B23.

In Step B23, the OS-attached page migration thread 102 selects a migration target page based on the LRU algorithm with reference to the LRU list 32 for OS. The OS-attached page migration thread 102 stores the selected migration target page into the SSD 20. Furthermore, the OS-attached page migration thread 102 deletes the migrated page to the SSD 20 from the LRU list 32 for OS.

The OS-attached page migration thread 102 obtains the CPU core number (the position data of the LRU list 32 for OS) associated with the migrated page to the SSD 20 with reference to the page association table 35. Then, the OS-attached page migration thread 102 deletes the migrated page from the LRU list 33 for each CPU core managed by the obtained CPU core number. At this timing, the timer may be reset. Then, the process returns to Step B21.

Further, as a result of the determination in Step B21, in cases where the OS-attached page migration thread 102 is not activated from the page migration thread 101 but is activated due to, for example, cancelling sleep (see NO route in Step B21), the process proceeds to Step B22.

In Step B22, the OS-attached page migration thread 102 determines, with reference to the time counted by the timer, whether a predetermined time elapses. Here, in cases where the predetermined time does not elapse (see NO route in Step B22), the process returns to Step B21.

In contrast, in cases where the predetermined time elapses (see YES route in Step B22), the process proceeds to Step B23.

(C) Effects:

As the above, according to the computer system 1b of an example of the second embodiment, the LRU lists 33 for each CPU core are distributedly provided for the respective CPU cores 11 so that the number of threads that access each LRU list 33 for each CPU core can be reduced. For example, in the example illustrated in FIG. 13, to each LRU list 33 for each CPU core, only the thread 104, the page migration thread 101, and the OS-attached page migration thread 102 of the local CPU core 11 access. This can shorten the time of locking for exclusive control on the LRU list 33 for each CPU core, so that the load of the spinlock on the CPU core 11 can be reduced and thereby the performance of the application can be enhanced.

By referring to the page association table 35, the OS-attached page migration thread 102 can easily grasp the LRU list 33 for each CPU core from which the migrated page is to be deleted, so that the migrated page can be deleted from the LRU list 33 for each CPU core.

Figure 17:
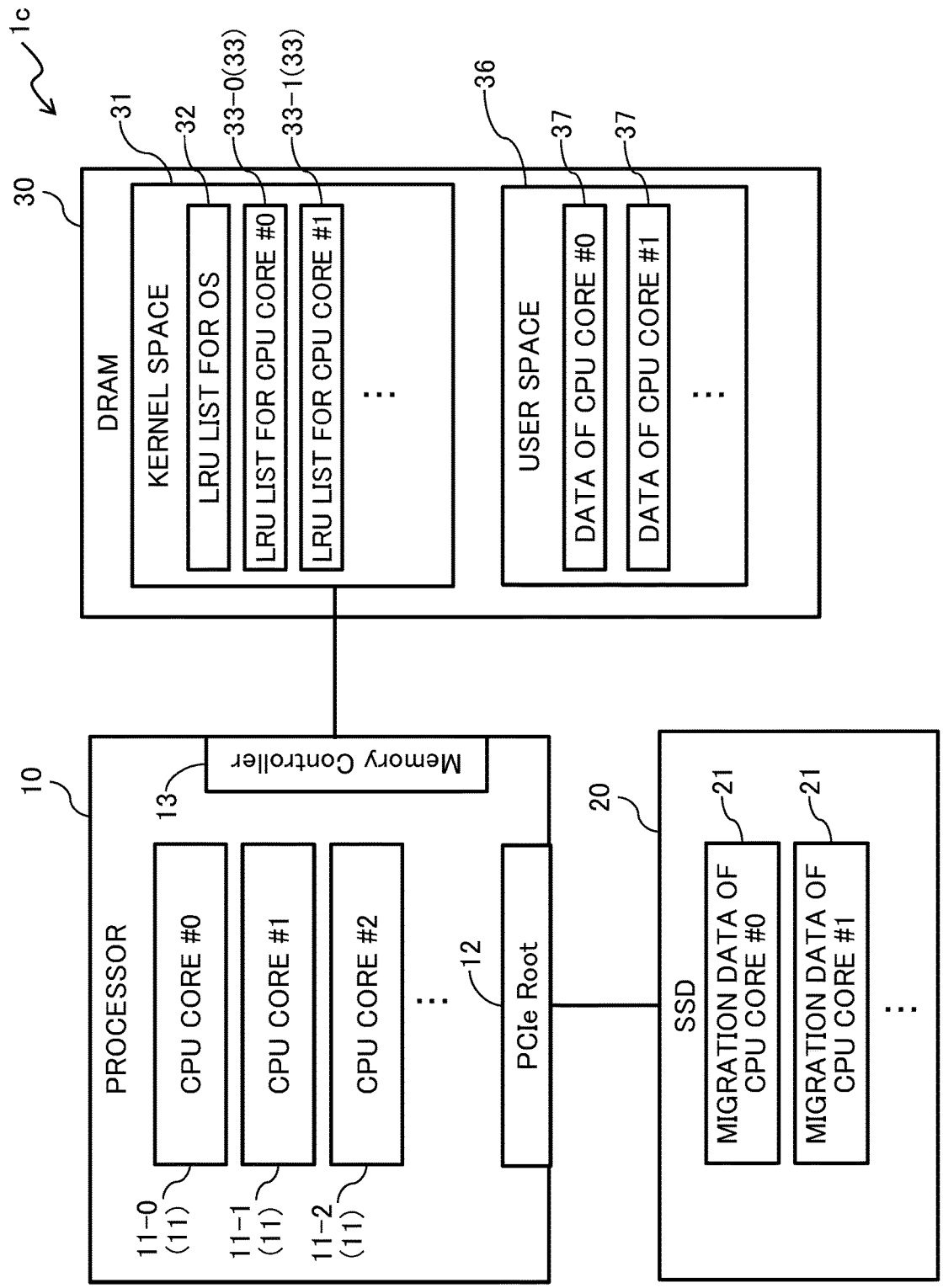
FIG. 17 is a diagram schematically illustrating a configuration of a computer system according to an example of a third embodiment.

3. Third Embodiment (A) Configuration:

FIG. 17 is a diagram schematically illustrating a configuration of a computer system 1c according to an example of a third embodiment.

As illustrated in FIG. 17, the computer system 1c according to the third embodiment excludes the migration data table 34 from the DRAM 30 of the first embodiment, and the remaining elements are configured the same as the computer system 1a of the first embodiment.

Like reference numbers designate same or substantially same elements described above, so repetitious description is omitted here.

Figure 18:
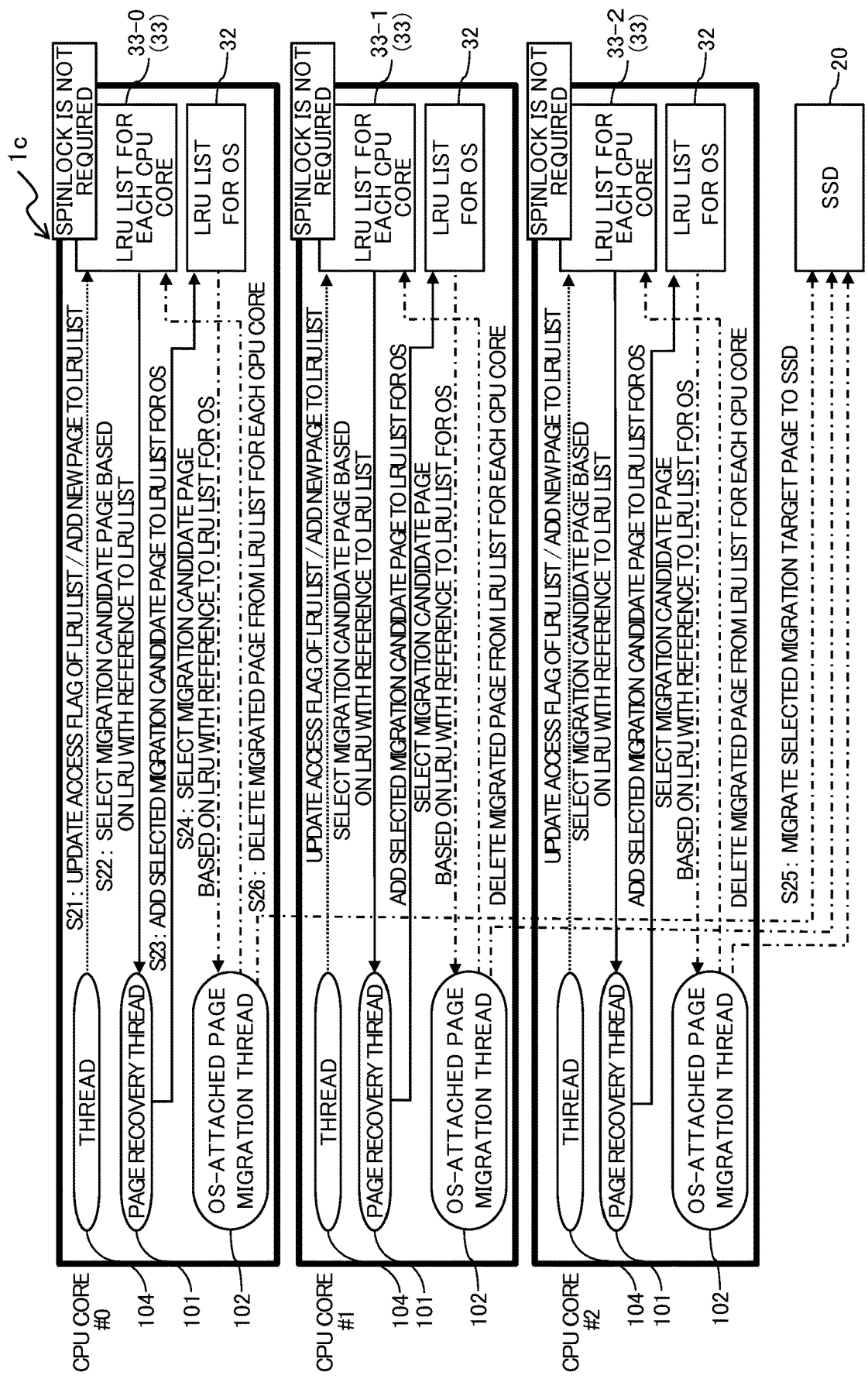
FIG. 18 is a diagram illustrating a method for managing a page in the computer system according to an example of the third embodiment.

FIG. 18 is a diagram illustrating a method for managing a page in the computer system 1c according to an example of the third embodiment.

The computer system 1c according to the third embodiment also includes the LRU list 33 for each CPU core 11.

The example of FIG. 18 illustrates the CPU cores #0 to #2 provided in the processor 10.

Also in the computer system 1c of the third embodiment, it is assumed that the CPU cores 11 do not share data.

In the computer system 1c according to the third embodiment, each of the CPU cores #0 to #2 executes the thread 104, the page migration thread 101, and the OS-attached page migration thread 102.

Each of the CPU cores #0 to #2 includes the LRU list 32 for OS. The LRU list 32 for OS of each of the CPU cores 11 is stored in the kernel space 31 of the DRAM 30.

Further, the LRU lists 33 for each CPU core are provided one for each of the CPU cores 11. That is, the LRU list 33-0 for the CPU core #0 is provided for the CPU core #0; the LRU list 33-1 for the CPU core #1 is provided for the CPU core #1; and the LRU list 33-2 for the CPU core #2 is provided for the CPU core #2.

Then, for example, the LRU list 33-0 for the CPU core #0 is accessed only from the thread 104, the page migration thread 101, and the OS-attached page migration thread that the CPU core #0 executes.

This means that the LRU list 33-0 for the CPU core #0 is accessed only from the CPU core #0, and no access is made from the other CPU cores #1 and #2.

Similarly, the LRU list 33-1 for the CPU core #1 is accessed only from the thread 104, the page migration thread 101, and the OS-attached page migration thread 102 that the CPU core #1 executes.

This means that the LRU list 33-1 for the CPU core #1 is accessed only from the CPU core #1, and no access is made from the other CPU cores #0 and #2.

Besides, the LRU list 33-2 for the CPU #2 core is accessed only from the thread 104, the page migration thread 101, and the OS-attached page migration thread 102 that the CPU core #2 executes.

This means that the LRU list 33-2 for the CPU core #2 is accessed only from the CPU core #2, and no access is made from the other CPU cores #0 and #1.

Here, description will now be made in relation to a method for managing a page in the computer system 1c according to the third embodiment, focusing on an example of a process performed in the CPU core #0.

The CPU core #0 achieves arithmetic processing by executing the thread 104. The thread 104 performs processing such as updating the access flag and adding a new page to the LRU list 33-0 for the CPU core #0 (see reference number S21 in FIG. 18).

The CPU core #0 refers to the LRU list 33-0 for the CPU core #0 and selects a migration candidate page from among pages registered in the LRU list 33-0 for the CPU core #0 on the basis of the LRU algorithm by executing the page migration thread 101 (see reference number S22 in FIG. 18).

The page migration thread 101 adds the selected migration candidate page to the LRU list 32 for OS that is managed by the CPU core #0 (see reference number S23 in FIG. 18).

By executing the OS-attached page migration thread 102, the CPU core #0 refers to the LRU list 32 for OS, and selects a migration target page from among migration candidate pages registered in the LRU list 32 for OS on the basis of the LRU algorithm (see reference number S24 in FIG. 18). Then, the OS-attached page migration thread 102 migrates the selected migration target page to the SSD 20 (see reference number S25 in FIG. 18).

The OS-attached page migration thread 102 deletes the migrated page from the LRU list 33 for each CPU core managed by the local CPU core #0 (see the reference number S26 in FIG. 18).

The remaining CPU cores 11 execute the process similarly.

In the computer system 1c according to the third embodiment, the OS-attached page migration thread 102 for each of multiple CPU cores 11 corresponds to a deleting processor that deletes the LRU list 32 for OS and the page migrated to the SSD 20 from the LRU list 33 for each CPU core.

Figure 19:
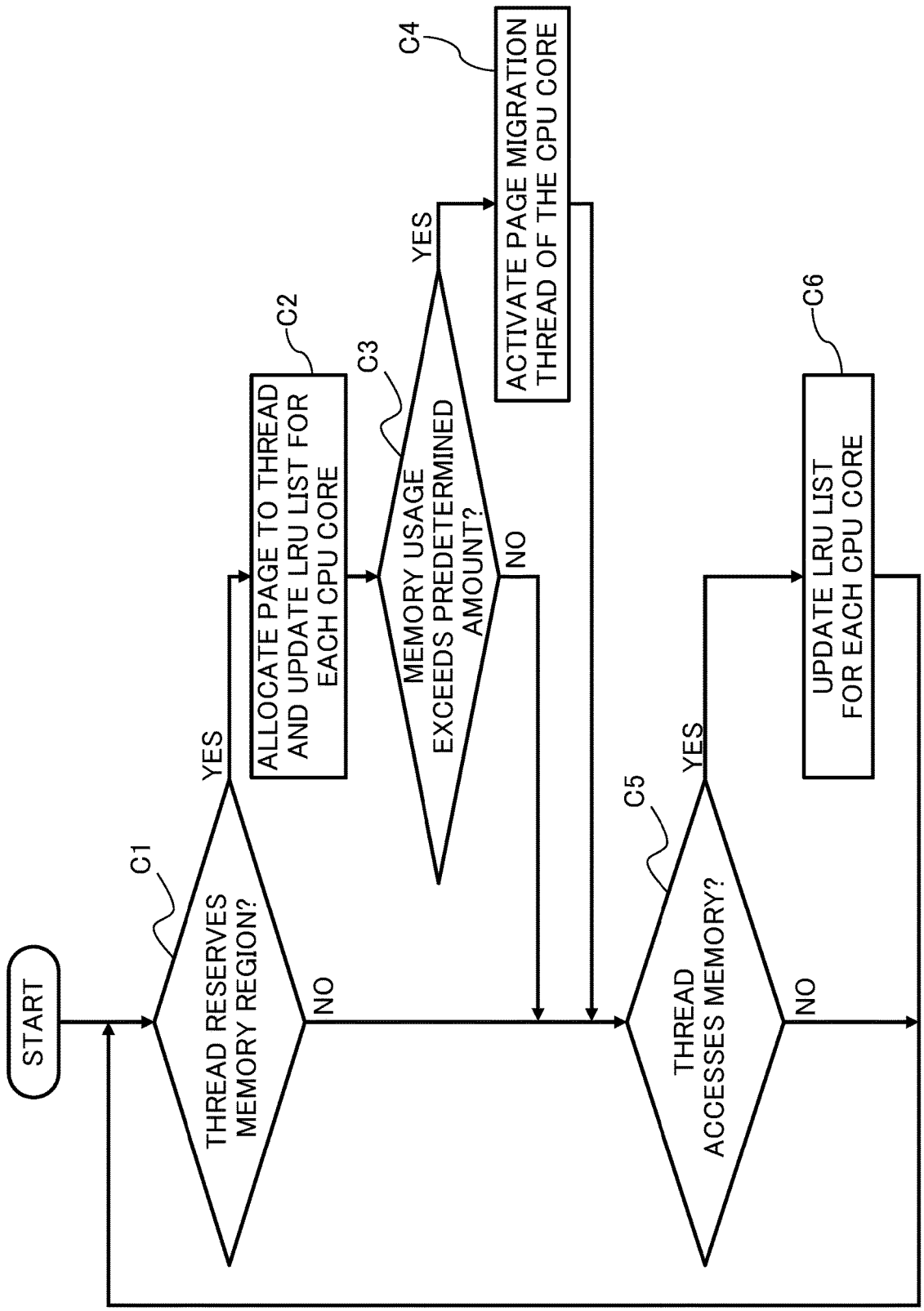
FIG. 19 is a flowchart illustrating a process of updating an LRU list for each CPU core by a thread in the computer system according to an example of the third embodiment.

(B) Operation:

Description will now be made in relation to the process of updating the LRU list 33 for each CPU core by the thread 104 in the computer system 1c according to an example of the third embodiment configured as described above with reference to the flowchart (Steps C1 to C6) illustrated in FIG. 19.

In Step C1, the thread 104 determines whether to reserve a page in a memory region. As a result of the determination, in cases where the page is to be reserved (see YES route in Step C1), the process proceeds to Step C2.

In Step C2, the thread 104 allocates the page to the thread 104 and updates the LRU list 33 for each CPU core.

In Step C3, the thread 104 determines whether a memory usage exceeds a predetermined threshold (a certain amount). As a result of the determination, in cases where the memory usage exceeds the certain amount (see YES route in Step C3), the thread 104 activates the page migration thread 101 in Step C4.

Then, the process proceeds to Step C5. Further, as a result of the determination in Step C1, in cases where the thread 104 does not reserve a page in the memory region (see NO route in Step C1), the process proceeds to Step C5.

In Step C5, the thread 104 determines whether the memory is accessed. As a result of the determination, in cases where a memory access is made (see YES route in Step C5), the process proceeds to Step C6 to update the LRU list 33 for each CPU core. Then, the process returns to Step C1.

As a result of the determination in Step C3, in cases where the memory usage does not exceed the predetermined value (see NO route in Step C3), the process proceeds to Step C5.

As a result of the determination in Step C5, in cases where a memory access is not made (see NO route in Step C5), the process returns to Step C1.

Figure 20:
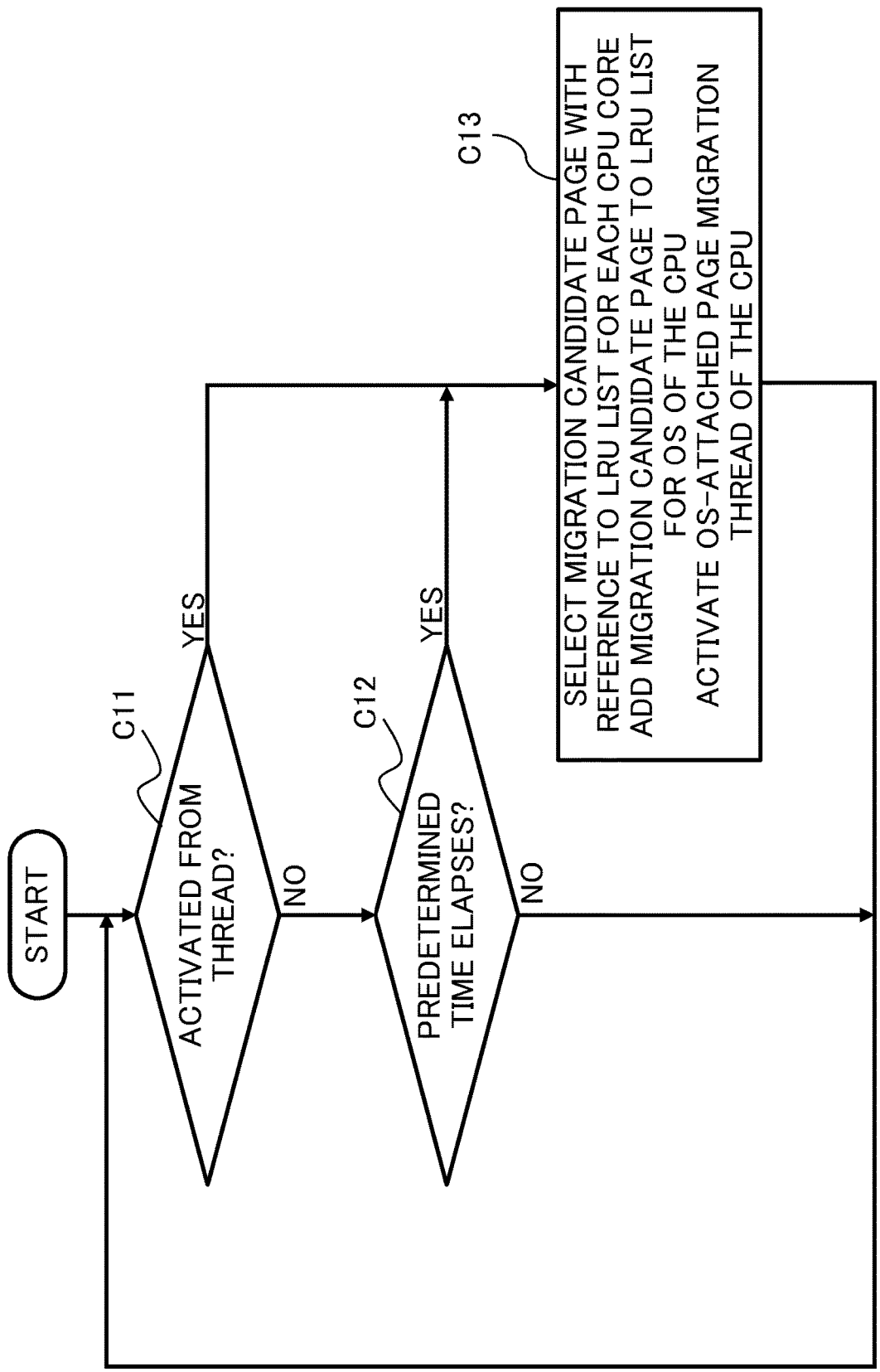
FIG. 20 is a flowchart illustrating a process performed by a page migration thread in the computer system according to an example of the third embodiment.

Next, description will now be made in relation to the process performed by the page migration thread 101 in the computer system 1c according to an example of the third embodiment with reference to the flowchart (Steps C11 to C13) illustrated in FIG. 20. Concurrently with the activation of the page migration thread 101, the time counting by a non-illustrated timer is started.

In Step C11, the page migration thread 101 determines whether to be activated from the thread 104 executed by a CPU core 11 (local CPU core 11) the same as the CPU core 11 that is executing the page migration thread 101 itself. As a result of the determination, in cases where the page migration thread 101 is started from the thread 104 (see YES route in Step C11), the process proceeds to Step C13.

In Step C13, the page migration thread 101 selects a migration candidate page based on the LRU algorithm with reference to the LRU list 33 for each CPU core. In addition, the page migration thread 101 adds the selected migration candidate page to the LRU list 32 for OS. Furthermore, the page migration thread 101 activates the OS-attached page migration thread 102 of the local CPU core 11. At this timing, the timer may be reset. Then, the process returns to Step C11.

Further, as a result of the determination in Step C11, in cases where the page migration thread 101 is not activated from the thread 104, but is activated due to, for example, cancelling sleep (see NO route in Step C11), the process proceeds to Step C12.

In Step C12, the page migration thread 101 determines, with reference to the time counted by the timer, whether a predetermined time elapses. Here, in cases where the predetermined time does not elapse (see NO route in Step C12), the process returns to Step C11.

In contrast, in cases where the predetermined time elapses (see YES route in Step C12), the process proceeds to Step C13.

Figure 21:
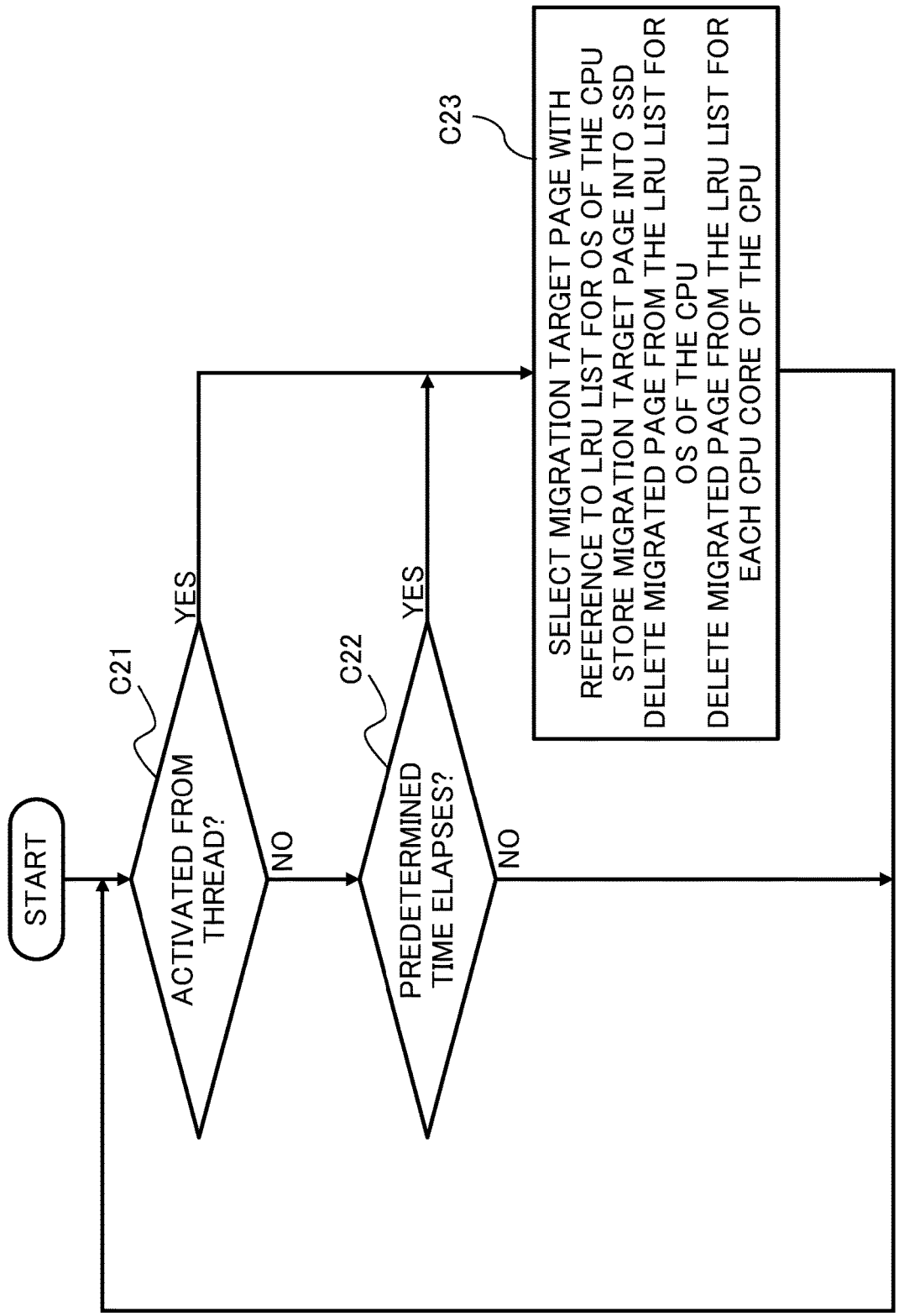
FIG. 21 is a flowchart illustrating a process performed by an OS-attached page migration thread in the computer system according to an example of the third embodiment.

Next, description will now be made in relation to the process performed by the OS-attached page migration thread 102 in the computer system 1c according to an example of the third embodiment with reference to the flowchart (Steps C21 to C23) illustrated in FIG. 21. Concurrently with the activation of the OS-attached page migration thread 102, the time counting by a non-illustrated timer is started.

In Step C21, the OS-attached page migration thread 102 determines whether to be activated from the page migration thread 101 itself. As a result of the determination, in cases where the OS-attached page migration thread 102 is activated from the page migration thread 101 (see YES route in Step C21), the process proceeds to Step C23.

In Step C23, the OS-attached page migration thread 102 selects a migration target page based on the LRU algorithm with reference to the LRU list 32 for OS of the local CPU core 11. The OS-attached page migration thread 102 stores the selected migration target page into the SSD 20. Furthermore, the OS-attached page migration thread 102 deletes the migrated page to the SSD 20 from the LRU list 32 for OS of the local CPU core 11. At this timing, the timer may be reset. Then, the process returns to Step C21.

Further, as a result of the determination in Step C21, in cases where the OS-attached page migration thread 102 is not activated from the page migration thread 101 but is activated due to, for example, cancelling sleep (see NO route in Step C21), the process proceeds to Step C22.

In Step C22, the OS-attached page migration thread 102 determines, with reference to the time counted by the timer, whether a predetermined time elapses. Here, in cases where the predetermined time does not elapse (see NO route in Step C22), the process returns to Step C21.

In contrast, in cases where the predetermined time elapses (see YES route in Step C22), the process proceeds to Step C23.

(C) Effects:

As the above, according to the computer system 1c of an example of the third embodiment, the LRU lists 33 for each CPU core are distributedly provided for the respective CPU cores 11 and also the multiple LRU lists 33 are independently of one another controlled for each CPU core 11. With this configuration, the LRU list 33 for each CPU core is only accessed from the local CPU core 11 but is inaccessible from the remaining CPU cores 11. This eliminates the need for exclusive control over each LRU list 33 for each CPU core and accordingly eliminates the need for spinlock. This reduces the load on the processor 10 due to the page migration process and enhances the performance of the application.

4. Miscellaneous

The disclosed techniques are not limited to the embodiment described above, and may be variously modified without departing from the scope of the present embodiment. The respective configurations and processes of the present embodiment can be selected, omitted, and combined according to the requirement.

For example, in the embodiments described above, the computer systems 1a-1c include the SSD 20 and use the SSD 20 as a low-speed memory, but is not limited to this. Alternatively, another storage device except for the SSD 20 may be used as the low-speed memory and various modification can be suggested.

In addition, in the above-described embodiment, a described example selects a page to be migrated to the SSD 20 on the basis of the LRU algorithm. However, the embodiments are not limited thereto. Alternatively a page to be moved to the SSD 20 may be selected on the basis of another algorithm such as, for example, First In, First Out (FIFO).

Further, in the embodiments described above, the LRU list 32 for OS and the LRU list 33 for each CPU core are stored in the kernel space 31 of the DRAM 30. This means that the kernel space 31 of the DRAM 30 functions as a first management data storing region and the second management data storing region, but the present embodiments are not limited to this. Alternatively, at least one of the LRU list 32 for OS and the LRU list 33 for each CPU core may be stored in another storage regions, such as the user space 36 of the DRAM 30 or the SSD 20, and may be implemented in various modifications.

In addition, those ordinary skilled in the art can carry out and manufacture of the present embodiments with reference to this disclosure.

5. Fourth Embodiment

In the computer systems 1a-1c of the above embodiments, the LRU list 33 for each CPU core is provided for each CPU core 11. The LRU list 33 for each CPU core is accessed only from the local CPU core 11 that includes the LRU list 33 for each CPU core, and no access is made from the other CPU cores 11. This makes it impossible to redistribute (reallocation) a cache capacity to the CPU cores 11.

For example, in a 2-CPU core configuration including the CPU core #0 and the CPU core #1, the memory access frequency of the CPU core #0 is assumed to be low. Under this state, in cases where the cache 30a does not have an empty space when the CPU core #1 is to reserve a new cache, one of the pages will be migrated to the SSD 20.

However, even if the CPU core #0 includes a page having a low access frequency, the CPU core #1 is unable to migrate the cache of the CPU core #0 to the SSD 20 because the CPU core #1 is unable to operate the LRU list 33 for each CPU core of the CPU core #0, and accordingly, the CPU core #1 migrates a page from the cache of the CPU core #1 to the SSD 20.

The cache capacity of the CPU core #0 and that of the CPU core #1 are both zero at the activation of the server. After the activation of the server, each of the CPU cores #0 and #1 wins the cache on the first-come basis and, finally, the cache allocation amounts of the CPU cores #0 and #1 at the time when the empty space capacity of the cache is exhausted become the initial cache capacities of the CPU cores #0 and #1, respectively. In cases where the initial state is not the optimal ratio, it is desirable to redistribute the cache.

One of the known conventional methods for redistributing the cache capacity between the CPU cores has used a cache miss frequency of each CPU core as an index.

Specifically, the cache is redistributed so as to gradually approach the optimum cache capacities by repeating a process of releasing a cache of a CPU core having a low cache-miss frequency by one page and increasing a cache of a CPU core having a high cache-miss frequency by one page.

However, such a conventional method takes a long time to reach the optimum cache capacities, and performance degradation during the optimization comes to be a problem.

A computer system 1d according to a fourth embodiment achieves shortening of the time for redistributing the cache capacities.

Figure 22:
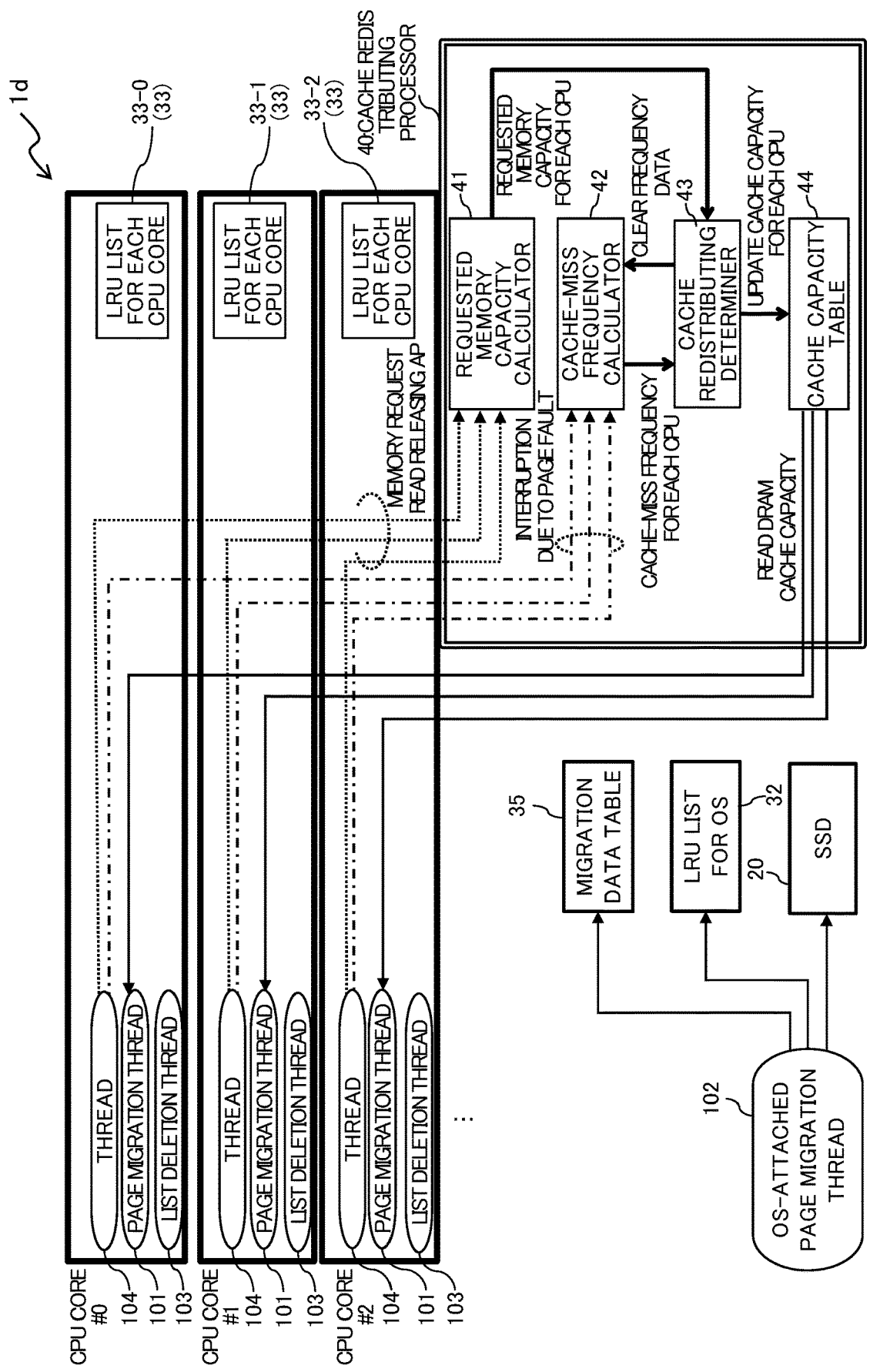
FIG. 22 is a diagram illustrating an example of a functional configuration of a computer system according to an example of a fourth embodiment.

(A) Configuration:

FIG. 22 is a diagram illustrating an example of the functional configuration of the computer system 1d according to an example of the fourth embodiment.

The computer system 1d illustrated in FIG. 22 includes a cache redistributing processor 40 in addition to the computer system 1a of the first embodiment illustrated in FIG. 6. Here, FIG. 22 omits illustration of a part of the configuration of the computer system 1a illustrated in FIG. 6.

Further, the computer system 1d of the fourth embodiment has the same hardware configuration as the computer system 1a of the first embodiment illustrated in FIG. 1.

—Cache Redistributing Processor 40—

The cache redistributing processor 40 redistributes the cache capacities using a requested memory capacity of each CPU core 11 and information of the cache-miss frequencies.

The cache redistributing processor 40 has the functions as a requested memory capacity calculator 41, a cache-miss frequency calculator 42, and a cache redistributing determiner 43.

The function as the cache redistributing processor 40 is achieved by a CPU core 11 set to be primary in advance among the CPU cores #0 to #3, for example.

—Cache Capacity Table 44—

A cache capacity table 44 holds a value (cache capacity value) of the cache capacity of each CPU core 11. The cache capacity value is a size of the storing region allocated to each CPU core 11 in the cache 30a, and represents a memory size that the CPU core 11 can use in the cache 30a.

The page migration thread 101 of each CPU core 11 manages the migration candidate page, using the cache capacity value read from the cache capacity table 44.

The page migration thread 101 reads the cache capacity value associated with the CPU core 11 (local CPU core 11) executing the same page migration thread 101 from the cache capacity table 44, and carries out the page migration process such that the cache capacity of the local CPU core 11 does not exceed this cache capacity value.

The information constituting the cache capacity table 44 is stored, for example, in the kernel space 31 of the DRAM 30.

—Requested Memory Capacity Calculator 41—

Into the requested memory capacity calculator 41, when the thread 104 of each CPU core 11 issues a memory reservation request or a memory releasing request (reads API), these pieces of information are input. The term "API" is an abbreviation for Application Programming Interface.

The requested memory capacity calculator 41 integrates requested memory capacities of each individual of the CPU cores 11. The requested memory capacity calculator 41 integrates the requested memory capacities of each individual CPU core 11, using information of the memory capacity when the API for reserving a memory is called from the thread.

An example of the information of the memory capacity may use a memory size included in the argument of a malloc function that reserves a dynamic memory. The manner of obtaining the information of requested memory capacity is not limited to the method using the arguments of the malloc function, but may be variously modified.

When a thread calls an API that releases a memory, the requested memory capacity calculator 41 subtracts the memory capacity to be released by the thread from the requested memory capacity.

The requested memory capacity for each of the CPU cores 11 calculated by the requested memory capacity calculator 41 is stored in the kernel space 31 of the DRAM 30, for example.

—Cache-Miss Frequency Calculator 42—

The cache-miss frequency calculator 42 counts the number of cache misses for each CPU core 11. For example, when an interruption due to a page fault occurs during memory access by a thread, the cache-miss frequency calculator 42 determines that a cache miss has occurred (cache miss determination). In the event of cache miss determination, the cache-miss frequency calculator 42 counts up (increments) the number of cache misses of the CPU core 11 on which the cache miss has occurred.

The cache-miss frequency calculator 42 calculates the number (cache miss frequency) of cache misses of each predetermined time interval for each CPU core 11. Here, the cache miss frequency is cleared at every lapse of a predetermined time by the cache redistributing determiner 43 to be described below.

The number (cache miss frequency) of cache misses for each CPU core 11 counted by the cache-miss frequency calculator 42 is, for example, stored in the kernel space 31 of the DRAM 30.

—Cache Redistributing Determiner 43—

The cache redistributing determiner 43 determines a cache capacity (redistribution cache size) to be redistributed on the basis of the requested memory capacity of each CPU core 11 and the information of the cache miss frequency of each CPU core 11.

For example, the cache redistributing determiner 43 checks the ratio of the maximum value of the cache miss frequency to the minimum value of the cache miss frequency among the cache miss frequencies of the multiple CPU cores 11 at regular time intervals, and when the ratio is equal to or more than a predetermined value (threshold), performs cache redistribution.

The cache redistributing determiner 43 determines the CPU cores 11 to be undergo cache redistribution and a memory capacity to be redistributed, and updates the cache capacity table 44 using the determined memory capacity. The value of the cache miss frequencies that the cache-miss frequency calculator 42 calculates are cleared at regular intervals.

Figure 23:
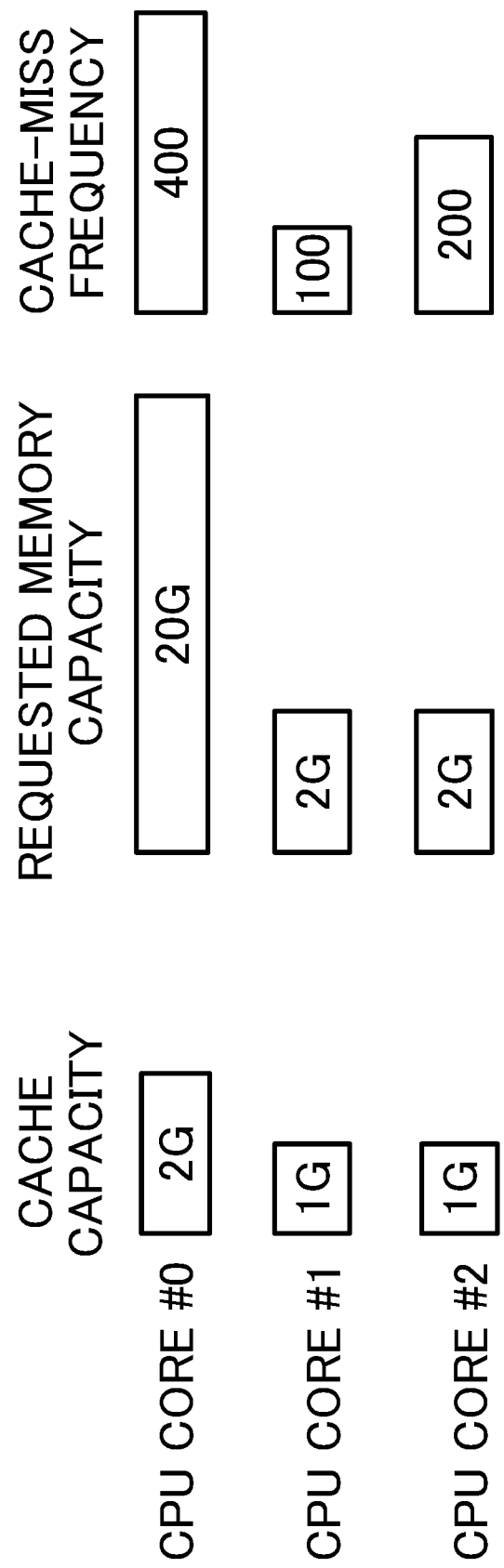
FIG. 23 is a diagram illustrating a process performed by a cache redistributing determiner of the computer system according to an example of the fourth embodiment.

FIG. 23 is a diagram illustrating a process performed by the cache redistributing determiner 43 of the computer system 1d according to an example of the fourth embodiment.

FIG. 23 exemplarily illustrates cache capacities, requested memory capacities, and cache miss frequencies of each of the CPU cores #0 to #2.

The cache redistributing determiner 43 performs the cache redistribution when a ratio of the maximum value of the cache miss frequencies to the minimum value of the cache miss frequencies is the threshold or more (e.g., 3 or more).

In the example illustrated in FIG. 23, the cache miss frequency "400" of the CPU core #0 is the maximum value, and the cache miss frequency "100" of the CPU core #1 is the minimum value. Since the ratio of these cache miss frequencies 4 (=400/100) is equal to or larger than the threshold "3", the cache redistributing determiner 43 determines to perform the cache redistribution.

In the cache redistribution, the cache redistributing determiner 43 determines the CPU core (CPU_L) having the lowest cache miss frequency to be a migration source of the cache capacity, and determines the CPU core 11 (CPU_H) having the highest cache miss frequency to be a migration destination of the cache capacity.

In the example illustrated in FIG. 23, the cache redistributing determiner 43 determines the CPU core #1 having the lowest cache miss frequency to be the migration source of the cache capacity, and determines the CPU core #0 having the highest cache miss frequency to be the migration destination of the cache capacity.

In the cache redistribution, the cache redistributing determiner 43 migrates the cache capacity from the CPU core 11 (CPU_L) with the lowest cache miss frequency to the CPU core 11 (CPU_H) with the highest cache miss frequency.

Further, the cache redistributing determiner 43 determines the cache capacity (redistribution cache size) to be migrated from the migration source CPU core 11 to the migration destination CPU core 11 through the redistribution.

The cache redistributing determiner 43 determines the number of pages (the number of migration pages) of data to be migrated by the redistribution based on a ratio (requested memory capacity ratio) between the requested memory capacity of the migration source CPU core 11 and the requested memory capacity of the migration destination CPU core 11. For example, the cache redistributing determiner 43 calculates the number of migration pages on the basis of following Equation (1).

Number of migration pages=requested memory capacity of the migration destination/requested memory capacity of the migration source    (1)

In the example shown in FIG. 23, since the requested memory capacity of the migration destination CPU core 11 is "20G" and the requested memory capacity of the migration source CPU core 11 is "2G", the cache redistributing determiner 43 calculates the number of migration pages as follows using Equation (1).

Number of migration pages=20/2=10 (Pages)

The cache redistributing determiner 43 then determines the redistribution cache size (e.g., 40 KB) by multiplying the calculated number of migration pages (e.g., 10 pages) by the data size (e.g., 4 KB) of a single page.

The cache redistributing determiner 43 updates the cache capacity table 44 using the calculated redistribution cache size. Specifically, the cache redistributing determiner 43 subtracts the redistribution cache size calculated from the cache capacity value of the migration source CPU core 11 in cache capacity table 44 and adds the redistribution cache size to the cache capacity value of the migration destination CPU core 11 in cache capacity table 44.

This means that the cache redistributing determiner 43 determines the redistribution cache size according to the ratio of requested memory capacity between the migration source CPU core 11 and the migration destination CPU core 11.

The page migration thread 101 selects the migration target pages as many as the migration pages, and stores the migration target pages into the SSD 20 at once.

This allows the redistribution to complete in shorter time than migrating the cache capacity of one page at a time.

Figure 24:
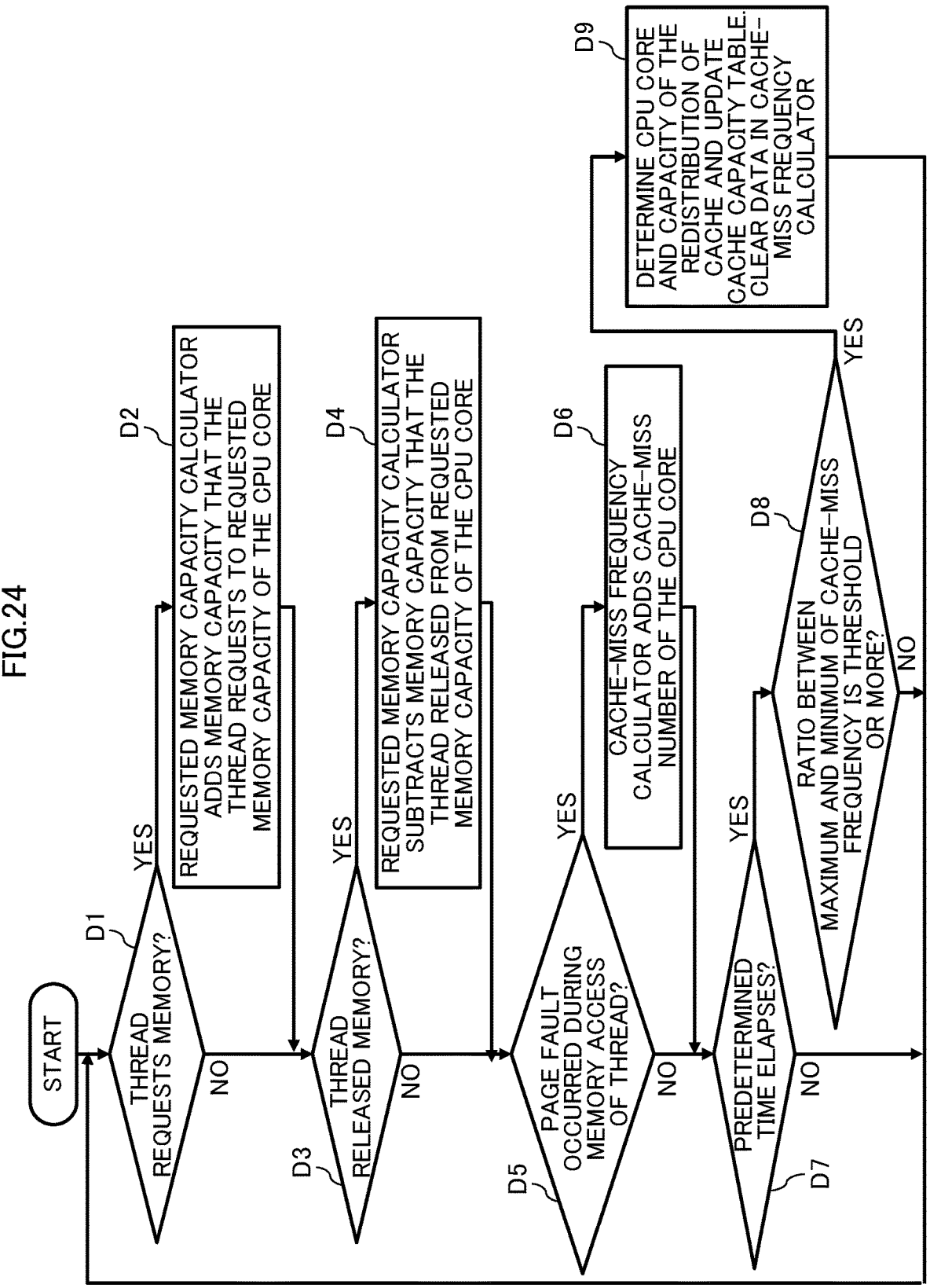
FIG. 24 is a flowchart illustrating a process of a page migration process in the computer system according to an example of the fourth embodiment.

(B) Operation:

Description will now be made in relation to a page migration process in the computer system 1$d$ according to an example of the fourth embodiment configured as the above with reference to the flowchart (Steps D1 to D9) illustrated in FIG. 24. Concurrently with the activation of the page migration thread 101, the time counting by a non-illustrated timer is started.

In Step D1, the requested memory capacity calculator 41 determines whether the thread 104 requested a memory (a memory reservation request). In cases where the thread 104 does not request the memory reservation (see NO route in Step D1), the process proceeds to Step D3.

In contrast, in cases where the thread 104 requests memory (see YES route in Step D1), the process proceeds to Step D2.

In Step D2, the requested memory capacity calculator 41 adds a memory capacity requested by the thread 104 to the requested memory capacity of the CPU core 11 that executes the thread 104. Then, the process proceeds to Step D3.

In Step D3, the requested memory capacity calculator 41 determines whether the thread 104 releases the memory. If the thread 104 has not release the memory (see NO route in Step D3), the process proceeds to Step D5.

If the thread 104 releases the memory (see YES route in Step D3), the process proceeds to Step D4.

In Step D4, the requested memory capacity calculator 41 subtracts the memory capacity that the thread 104 has released from the requested memory capacity of the CPU core 11 that executes the thread 104. Then, the process proceeds to Step D5.

In Step D5, the cache-miss frequency calculator 42 determines whether a page fault has occurred in memory accessing of the thread 104. If a page fault has not occurred (see NO route in Step D5), the process proceeds to Step D7.

If a page fault has occurred (see YES route in Step D5), the process proceeds to Step D6.

In Step D6, the cache-miss frequency calculator 42 adds (increments) the number (cache miss frequency) of cache misses of the CPU core 11 that executes the thread 104. Then, the process proceeds to Step D7.

In Step D7, the cache redistributing determiner 43 determines, with reference to the time counted by the timer, whether a predetermined time elapses. Here, in cases where the predetermined time does not elapse (see NO route in Step D7), the process returns to Step D1.

In contrast, in cases where the predetermined time elapses (see YES route in Step D7), the process proceeds to Step D8.

In Step D8, the cache redistributing determiner 43 determines whether the ratio of the maximum value to the minimum value among the cache miss frequencies of the multiple CPU cores 11 provided in the present computer system 1$d$ is the threshold or more. As a result of the determination, in cases where the ratio of the maximum value to the minimum value of the cache miss frequencies is not the threshold or more (see NO route in Step D8), the process returns to Step D1.

On the other hand, in cases where the ratio of the maximum value to the minimum value of the cache miss frequencies is the threshold or more (see YES route in Step D8), the process proceeds to Step D9.

In Step D9, the cache redistributing determiner 43 determines the redistribution cache size according to the ratio of the requested memory capacity between the migration source CPU core 11 and the migration destination CPU core 11.

In addition, the cache redistributing determiner 43 also updates the cache capacity table 44 with the calculated redistribution cache size. Furthermore, the cache redistributing determiner 43 clears the cache miss frequencies calculated by the cache-miss frequency calculator 42. Then, the process returns to Step D1.

(C) Effects:

According to the computer system 1$d$ as an example of the fourth embodiment, the same effect as that of the computer system 1$a$ of the first embodiment described above can be obtained, and in the configuration in which the LRU lists (LRU lists 33 for each CPU core) of the cache are separated for each CPU core 11, the capacity redistribution of the cache can be performed between the CPU cores 11 by the cache redistributing processor 40 performing the redistribution of the cache capacities between the CPU cores 11.

In the cache redistributing processor 40, the cache redistributing determiner 43 performs cache redistribution when the ratio of the maximum value to the minimum value among the cache miss frequencies is the threshold or more. That is, when the cache miss frequencies of the multiple CPU cores 11 deviate, the cache redistributing processor 40 performs the cache redistribution process to eliminate the deviation in the cache miss frequency and enhances the average performance.

In addition, the cache redistributing determiner 43 determines the CPU core #1 having the lowest cache miss frequency as the source of migrating the cache capacity, and determines the CPU core #0 having the highest cache miss frequency as the destination of migrating the cache capacity. This makes it possible to efficiently eliminate the deviation in cache miss frequency and enhance the average performance.

Furthermore, the cache redistributing determiner 43 determines the redistribution cache size according to the ratio of the requested memory capacity between the migration source CPU core 11 and the migration destination CPU core 11. This reduces the time for redistribution of a cache capacity as compared to the conventional method that alternately repeating the cache of the CPU core having a low cache miss frequency is released by one page and in turn the cache of the CPU core having a high cache miss frequency is increased by one page. Also, by shortening the time for redistribution of cache capacities, the time of performance degradation due to cache capacity imbalance can be shortened and the average performance can be enhanced.

The computer system 1d of the fourth embodiment described above is formed by providing the cache redistributing processor 40 to the computer system 1a of the first embodiment illustrated in FIG. 6, but is not limited to this. Alternatively, the computer system 1d of the fourth embodiment may be formed by providing the cache redistributing processor 40 to the computer system 1b of the second embodiment or the computer system 1c of the third embodiment described above, and another various modification can be suggested.

According to embodiments, the load on the processor can be reduced by reducing the occurrence of spinlock.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus comprising:
a first memory that stores data in a unit of page;
a second memory that stores data of a page of a migration target from the first memory;
a processor comprising a plurality of calculating cores;
a first management data storing region that stores a plurality of least recently used (LRU) lists for each calculating core being provided one for each of the plurality of calculating cores and representing an order of migration of pages of a page group allocated to the calculating core among a plurality of the pages;
a second management data storing region that stores an LRU list for OS (operating system) provided for an operating system and managing a plurality of pages selected in accordance with the order of migration among the page group of the plurality of LRU lists for each calculating core as a group of candidate pages to be migrated to the second memory; and
a migration processor that migrates data of a page selected from the group of the LRU list for OS from the first memory to the second memory.

2. The information processing apparatus according to claim 1, further comprising:
a storing unit that stores migration management data managing the page that the migration processor migrates to the second memory; and
a plurality of deleting processors that are provided one for each of the plurality of calculating cores and that deletes, from the LRU lists for each calculating core, the page migrated to the second memory with reference to the migration management data.

3. The information processing apparatus according to claim 1, further comprising:
a storing unit that stores page association data that associates the page migrated to the second memory and one of the plurality of calculating cores; and
a deleting processor that deletes, from the LRU lists for each calculating core, the page migrated to the second memory with reference to the page association data.

4. The information processing apparatus according to claim 1, wherein each of the plurality of calculating core comprises:
the LRU list for OS; and
a deleting processor that deletes, from the LRU lists for each calculating core, the page migrated to the second memory.

5. An information processing apparatus comprising:
a processor comprising a plurality of calculating cores;
a requested memory capacity calculator that integrates a plurality of requested memory capacities of the plurality of calculating cores into an integrated requested memory capacity;
a cache-miss frequency calculator that counts a number of cache-misses of each of the plurality of calculating cores; and
a cache redistributing determiner that determines, based on a ratio between the integrated requested memory capacity of a calculating core of a migration source of the redistributing and the integrated requested memory capacity of the migration destination of the redistributing, a cache capacity to be redistributed when a ratio of a maximum value of the number of cache-misses in the calculating cores to a minimum value of the number of cache-misses in the calculating cores is at least equal to a threshold.

6. The information processing apparatus according to claim 5, wherein the cache distributing determiner determines one of the plurality of calculating cores having the maximum number of cache-misses to be a migration source of the cache capacity and determines one of the plurality of calculating cores having the minimum number of cache-misses to be a migration destination of the cache capacity.

7. A non-transitory computer-readable recording medium having stored therein a memory control program applied to an information processing apparatus comprising a first memory that stores data in a unit of page, a second memory that stores data of a page of a migration target from the first memory, and a processor comprising a plurality of calculating cores, wherein:
the memory control program causes a first calculating core, being one of the plurality of calculating cores and using the first memory, to execute a process comprising registering a page to which the first calculating core makes a data access into a plurality of least recently used (LRU) lists for each calculating core representing an order of migration of pages of a page group allocated to the first calculating core; and
the memory control program causes a second calculating core being one of the plurality of calculating cores to execute a process comprising:
referring to an LRU list for OS (operating system) being provided for an operating system and managing a plurality of pages selected in accordance with the order of migration among the page group of the plurality of LRU lists for each calculating core as a group of candidate pages to be migrated to the second memory; and
migrating data of a page selected from the group of the LRU list for OS from the first memory to the second memory.

8. The non-transitory computer-readable recording medium according to claim 7, wherein:
the memory control program causes one of the plurality of calculating cores to execute a process comprising storing migration management data managing the page migrated to the second memory; and
the memory control program causes each of the plurality of calculating cores to execute a process comprising deleting, from the LRU lists for each calculating core, the page migrated to the second memory with reference to the migration management data.

9. The non-transitory computer-readable recording medium according to claim 7, wherein the memory control program causes one of the plurality of calculating cores to execute a process comprising:
   storing page association data that associates the page migrated to the second memory and one of the plurality of calculating cores; and
   deleting, from the LRU lists for each calculating core, the page migrated to the second memory with reference to the page association data.

10. The non-transitory computer-readable recording medium according to claim 7, wherein the memory control program causes each of the plurality of calculating cores to execute a process comprising deleting, from the LRU lists for each calculating core, the page migrated to the second memory.

11. A non-transitory computer-readable recording medium having stored therein an information processing program applied in an information processing apparatus comprising a processor comprising a plurality of calculating cores, the information processing program causing one of the plurality of calculating cores to execute a process comprising:
   integrating a plurality of requested memory capacities of the plurality of calculating cores into an integrated requested memory capacity;
   counting a number of cache misses of each of the plurality of calculating cores; and
   determining, based on a ratio between the integrated requested memory capacity of a calculating core of a migration source of the redistributing and the integrated requested memory capacity of the migration destination of the redistributing, a cache capacity to be redistributed when a ratio of a maximum number of cache-misses in the plurality of calculating cores to a minimum number of cache-misses in the plurality of calculating cores is at least equal to a threshold.

12. The non-transitory computer-readable recording medium according to claim 11, the information processing program causing one of the plurality of calculating cores to execute a process comprising:
   determining one of the plurality of calculating cores having the minimum number of cache-misses to be a migration source of the cache capacity; and
   determining one of the plurality of calculating cores having the maximum number of cache-misses to be a migration destination of the cache capacity.

* * * * *